(12) United States Patent
Bahl et al.

(10) Patent No.: US 8,015,139 B2
(45) Date of Patent: Sep. 6, 2011

(54) INFERRING CANDIDATES THAT ARE POTENTIALLY RESPONSIBLE FOR USER-PERCEPTIBLE NETWORK PROBLEMS

(75) Inventors: Paramvir Bahl, Sammamish, WA (US); Ranveer Chandra, Kirkland, WA (US); Srikanth Kandula, Somerville, MA (US); David A. Maltz, Bellevue, WA (US); Ming Zhang, Redmond, WA (US); Albert Greenberg, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 861 days.

(21) Appl. No.: 12/039,703

(22) Filed: Feb. 28, 2008

(65) Prior Publication Data

US 2008/0222068 A1    Sep. 11, 2008

Related U.S. Application Data

(60) Provisional application No. 60/893,350, filed on Mar. 6, 2007.

(51) Int. Cl.
*G06N 5/04* (2006.01)
(52) U.S. Cl. ............................ 706/46; 709/224; 709/223
(58) Field of Classification Search ...................... 706/46
See application file for complete search history.

(56) References Cited

U.S. PATENT DOCUMENTS

| | | | |
|---|---|---|---|
| 4,933,933 A | 6/1990 | Dally et al. | |
| 5,309,448 A | 5/1994 | Bouloutas et al. | |
| 5,850,388 A | 12/1998 | Anderson et al. | |
| 6,115,393 A | 9/2000 | Engel et al. | |
| 6,336,138 B1 | 1/2002 | Caswell et al. | |
| 6,373,825 B1 | 4/2002 | Fuchs et al. | |
| 6,442,694 B1 | 8/2002 | Bergman et al. | |
| 6,456,306 B1 | 9/2002 | Chin et al. | |
| 6,574,788 B1 | 6/2003 | Levine et al. | |

(Continued)

FOREIGN PATENT DOCUMENTS

EP    1191803 A1    3/2002

(Continued)

OTHER PUBLICATIONS

Paramvir Victor Bahl, Paul Barham, Richard Black, Ranveer Chandra, Moises Goldszmidt, Rebecca Isaacs, Srikanth Kandula, Lun Li, John MacCormick, David Maltz, Richard Mortier, Mike Wawrzoniak, Ming Zhang 5th ACM Workshop on Hot Topics in Networking (HotNets), Nov. 2006.*

(Continued)

*Primary Examiner* — David R Vincent
*Assistant Examiner* — Ola Olude-Afolabi
(74) *Attorney, Agent, or Firm* — Lee & Hayes, PLLC

(57) ABSTRACT

Candidates that are potentially responsible for user-perceptible network problems may be inferred. In an example embodiment, a system includes an inference engine to produce a list of candidates that are potentially responsible for user-perceptible network problems, with the candidates being network components that may include both services and network elements. A response to a service request may be a non response, an incorrect response, an untimely correct response, or a timely correct response. The user-perceptible network problems may include the untimely correct response as well as the non response and the incorrect response. In another example embodiment, a method includes monitoring a network and producing a list of candidates that are potentially responsible for user-perceptible network problems. The candidates of the list may include both services and network elements of the monitored network.

20 Claims, 15 Drawing Sheets

Example System for Inferring Potentially-Responsible Candidates

U.S. PATENT DOCUMENTS

| | | | |
|---|---|---|---|
| 6,628,304 | B2 | 9/2003 | Mitchell et al. |
| 6,691,249 | B1 | 2/2004 | Barford et al. |
| 6,704,812 | B2 | 3/2004 | Bakke et al. |
| 6,747,957 | B1 * | 6/2004 | Pithawala et al. .............. 370/252 |
| 6,751,661 | B1 | 6/2004 | Geddes |
| 6,826,590 | B1 | 11/2004 | Glanzer et al. |
| 6,873,619 | B1 | 3/2005 | Edwards |
| 6,959,403 | B2 | 10/2005 | Dierauer et al. |
| 6,993,686 | B1 | 1/2006 | Groenendaal et al. |
| 7,131,037 | B1 | 10/2006 | LeFaive et al. |
| 7,142,820 | B1 | 11/2006 | Rajala |
| 7,151,744 | B2 | 12/2006 | Sarkinen et al. |
| 7,240,325 | B2 | 7/2007 | Keller |
| 7,269,625 | B1 | 9/2007 | Willhide et al. |
| 7,328,127 | B2 | 2/2008 | Otsuka et al. |
| 7,328,200 | B2 | 2/2008 | Przytula |
| 7,389,347 | B2 | 6/2008 | Brodie et al. |
| 7,409,676 | B2 | 8/2008 | Agarwal et al. |
| 7,483,379 | B2 | 1/2009 | Kan et al. |
| 7,627,671 | B1 | 12/2009 | Palma et al. |
| 7,809,663 | B1 | 10/2010 | Birch et al. |
| 2002/0032769 | A1 | 3/2002 | Barkai et al. |
| 2002/0165957 | A1 | 11/2002 | Devoe et al. |
| 2003/0084146 | A1 | 5/2003 | Schilling et al. |
| 2004/0172467 | A1 | 9/2004 | Wechter et al. |
| 2005/0071445 | A1 | 3/2005 | Siorek et al. |
| 2005/0071457 | A1 | 3/2005 | Yang-Huffman et al. |
| 2005/0226195 | A1 | 10/2005 | Paris et al. |
| 2005/0243729 | A1 | 11/2005 | Jorgenson et al. |
| 2006/0085858 | A1 | 4/2006 | Noel et al. |
| 2006/0153068 | A1 | 7/2006 | Dally et al. |
| 2007/0043861 | A1 | 2/2007 | Baron et al. |
| 2007/0162595 | A1 | 7/2007 | Samprathi |
| 2008/0016206 | A1 | 1/2008 | Ma et al. |

FOREIGN PATENT DOCUMENTS

| | | |
|---|---|---|
| WO | WO03067431 A1 | 8/2003 |
| WO | WO2005060162 A2 | 6/2005 |

OTHER PUBLICATIONS

Bahl, et al., "Discovering Dependencies for Network Management", available as early as Dec. 26, 2006, at <<http://research.microsoft.com/projects/constellation/papers/hotnets06.pdf>>, pp. 1-6.

Friedman, et al., "Load Balancing Schemes for High Throughput Distributed Fault-Tolerant Servers", available as early as Dec. 26, 2006, at <<http://historical.ncstrl.org/tr/ps/cornellcs/TR96-1616.ps>>, Decmber 8, 1996, pp. 1-20.

Steinder, et al., "End-to-end Service Failure Diagnosis Using Belief Networks", available as early as Dec. 26, 2006, at <<http://www.cis.udel.edu/~sethi/papers/02/noms02.pdf>>, University of Delaware, pp. 1-16.

Boudali et al., "A discrete-time Bayesian network reliability modeling and analysis framework", Science Direct, Reliability Engineering and System Safety 87, 2005, University of Virginia, School of Engineering and Applied Science, Aug. 12, 2004, pp. 337-pp. 349.

Steinder, "Probabilistic Fault Localization in Communication Systems Using Belief Networks", IEEE/ACM Transactions on Networking, vol. 12, No. 5, Oct. 2004, pp. 809-pp. 822.

Bahl, et al., "Towards Highly Reliable Enterprise Network Services Via Inference of Multi-level Dependencies", SIGCOMM'07, Aug. 27-31, 2007, pp. 1-12.

Kandula, et al., "Shrink: A Tool for Failure Diagnosis in IP Networks", SIGCOMM'05 Workshops, Aug. 2005, pp. 1-6.

Kompella, et al., "IP Fault Localization Via Risk Modeling", University of California and AT&T Labs-Research, pp. 1-15.

Lau, et al., "Service Model and its Application to Impact Analysis", Telcordia Transactions, 2004, pp. 1-12.

Natu, et al., "Active Probing Approach for Fault Localization in Computer Networks" available as early as Dec. 26, 2006, at <<http://www.cis.udel.edu/~sethi/papers/06/e2emon06.pdf>>, pp. 9.

Reynolds, et al., "WAP5: Black-box Performance Debugging for Wide-Area Systems", International World Wide Web, May 23-26, 2006, pp. 1-10.

Rish, et al., "Efficient fault diagnosis using probing", AAAI, 2005, pp. 1-8.

Smarts, "InCharge Application Services Manager User's Guide", System Management ARTS Incorporated, Version 5.0.1, Dec. 2002, pp. 1-76.

Steinder, et al., "A survey of fault localization techniques in computer networks", avaliable as early as Dec. 26, 2006, at <<http://www.cis.udel.edu/~sethi/papers/04/socp04.pdf>>, 2004, pp. 165-194.

Steinder, et al., "The present and future of event correlation:A need for end-to-end service fault localization", available as early as Dec. 26, 2006, at <<http://www.cis.udel.edu/~steinder/PAPERS/sci2001.pdf>>, pp. 6.

Yemini, et al., "High Speed and Robust Event Correlation", IEEE, May 1996, pp. 82-90.

* cited by examiner

Example Inference Environment

Example Portion of an Inference Graph

Let $x = 1 - d$

504(S)

Example Selector Meta-Node

504(F)

Example Fail-Over Meta-Node

INFERRING CANDIDATES THAT ARE POTENTIALLY RESPONSIBLE FOR USER-PERCEPTIBLE NETWORK PROBLEMS

CROSS-REFERENCE(S) TO RELATED APPLICATION(S)

The U.S. Nonprovisional Patent Application claims the benefit of copending U.S. Provisional Patent Application 60/893,350, filed on 6 Mar. 2007 and entitled "Inferring Potentially-Responsible Candidates". U.S. Provisional Patent Application 60/893,350 is hereby incorporated by reference in its entirety herein.

BACKGROUND

Using a network-based service can be a frustrating experience that is marked by the appearances of familiar hourglass or beachball icons. These icons indicate that a request is in progress and that a user must continue to wait for a response to the request. Unfortunately, the request may not be fulfilled for some time, if ever. The user is often not provided an accurate indication of when the request is expected to be fulfilled. Moreover, when there is a problem, the user is rarely provided a reliable indication of where the problem lies, and the user is even less likely to be told how the problem might be mitigated.

Even inside the network of a single enterprise, where traffic does not need to cross the open Internet, users are subjected to the negative effects of network problems. Information technology (IT) personnel of the enterprise are charged with locating and mitigating these network problems. Unfortunately, IT personnel are often also uncertain how to diagnose and remedy such network problems. Although IT personnel are given management tools that indicate when a particular hardware component (e.g., a server, link, switch, etc.) is overloaded, these tools can produce so many alerts that the IT personnel eventually start to ignore them. Such management tools also usually fail to address the integrated and changing nature of enterprise networks. In short, network problems tend to persist because current network and service monitoring tools do not scale to the size, complexity, or rate-of-change of today's enterprise networks.

SUMMARY

Candidates that are potentially responsible for user-perceptible network problems may be inferred. In an example embodiment, a system includes an inference engine to produce a list of candidates that are potentially responsible for user-perceptible network problems, with the candidates being network components that may include both services and network elements. A response to a service request may be a non response, an incorrect response, an untimely correct response, or a timely correct response. The user-perceptible network problems may include the untimely correct response as well as the non response and the incorrect response. In another example embodiment, a method includes monitoring a network and producing a list of candidates that are potentially responsible for user-perceptible network problems. In the monitored network, a response to a service request may be a non response, an incorrect response, an untimely correct response, or a timely correct response. The candidates of the list are network components that may include both services and network elements. The user-perceptible network problems may include the non response, the incorrect response, and the untimely correct response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introducing to Inferring Potentially-Responsible Candidates

Figure 1:
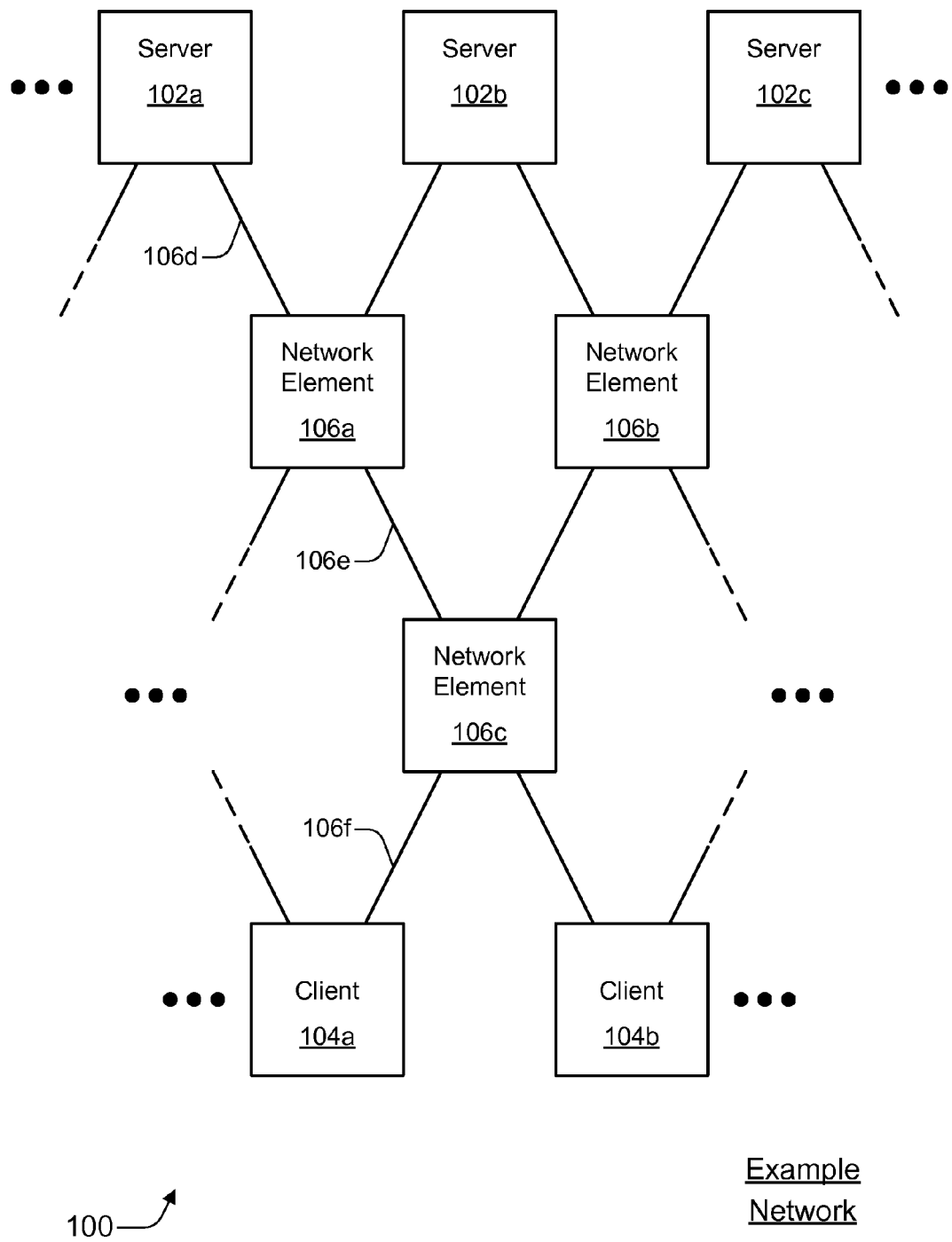
FIG. 1 is a block diagram of an example network that may be used in conjunction with embodiments for inferring potentially-responsible candidates.

Localizing the sources of network problems in large, e.g., enterprise networks is extremely challenging. Dependencies are numerous, complex, and inherently multi-level, spanning a plethora of hardware and software components across both the core and the computing infrastructure of the network. An inference graph model is described herein that can be employed to discover and actually exploit these dependencies for fast and accurate network problem localization. Network problems can arise at any level and as a result of any general network component. For example, network problems can be with the core of a network (e.g., routers, links, switches, etc.), with the endhosts of a network (e.g., clients that are used by humans, servers that provide some service or application to clients and/or other servers, etc.), with services of the network (e.g., websites, web services, DNS, etc.), and so forth. Examples of general network components that can cause and/or be affected by network problems are described herein below with particular reference to FIG. 3.

Embodiments of this inference graph model are adaptable to address user-perceptible problems that are rooted in conditions giving rise to partial service degradation as well as hard faults. An inference graph is constructed for an operational enterprise network (or another network). The inference graph may be used to infer various attributes of the network. Methods, systems, etc. are described that may be used to leverage the inference graph results for relatively fast and accurate network problem localization and alerting.

For certain example embodiments, a general inference system is described. An inference system can provide IT administrators tools to localize performance degradation issues as well as hard failures that can affect an end-user. An example inference implementation can: (1) detect the existence of hard faults and performance degradations by monitoring the response times of service requests; (2) determine a set of components that might be responsible for a given hard fault or performance degradation; and/or (3) localize the network problem to the most likely component(s) using probabilistic techniques. The portions of an example inference system that are described extensively herein pertain primarily to using an inference graph to infer potentially-responsible candidates for network problem localization.

A number of challenges may be confronted when implementing an inference system. Three example challenges follow. First, even relatively simple requests like fetching a webpage involve multiple services, such as DNS servers, authentication servers, web-servers, and the backend SQL databases that hold the web-page data. Problems at any of these servers can affect the success or failure of the request. Unfortunately, the dependencies among different components in IT systems are typically not documented anywhere, and they evolve continually as systems grow or new applications are added. Nevertheless, an example embodiment of an inference system is able to automatically discover the set of components involved in the processing of requests.

Second, both performance degradations and hard faults can stem from problems anywhere in the IT infrastructure, i.e., a service, a router, a link, and so forth. Therefore, while there is some value in using an inference graph to monitor the services and the network elements separately, additional information and/or accuracy can be achieved by correlating their interdependencies. Consequently, an example embodiment of an inference system is capable of operating across both service and network layers simultaneously. Third, failover and load-balancing techniques commonly used in enterprise networks make determining the responsible component even more difficult because the set of components involved with a requested service may change from request to request. Consequently, an example embodiment of an inference system enables such failover and load-balancing techniques to be modeled as part of the inference graph.

In an example embodiment of an inference system, a number of aspects may be implemented. First, software agents of the inference system may run on each endhost to analyze the packets that the endhost sends and receives so as to determine the set of services that the endhost depends on. The agent may also track the distribution of response times experienced for each service with which the endhost communicates, fit a Gaussian model to the empirical data, and generate notifications when a response time falls outside the nominal range. Second, the inference system may combine the individual views of dependency computed by each endhost (e.g., and realized as a service-level dependency graph) to assemble an inference graph. The inference graph can capture the dependencies between each of the components of the IT network infrastructure. This inference graph can be a multi-level graph so as to represent the multiple levels of dependencies that are found in a typical IT network infrastructure, for example, as servers depend on other servers.

The inference system can use information provided by one or more endhosts to fill in any gaps in the dependency information that is reported from another endhost. When constructing the inference graph, the inference system may augment it with information about the routers and links used to carry packets between endhosts. The inference system can therefore encode in a single model each of the components of a network that can affect a service request. The inference graph can then be used by the inference system along with agent observations to localize network problems. Third, in addition to the aspects described above that can be performed automatically, network operators may be empowered to incorporate into the inference graph model the load-balancing and failover mechanisms that are present in their networks.

To focus on performance degradations as well as hard faults, certain described embodiments of inference systems address problems that affect the users of the IT infrastructure by using monitored response times as indicators of performance degradations. This can mitigate an issue with current management approaches in which operators are overwhelmed with many, relatively meaningless, alerts that report parameter-based overloading situations that may not even directly affect users. In contrast, example inference systems as described herein usually generate alarms in response to user-perceptible network problems, including performance degradations or hard faults. An aspect of an example approach to recognizing user-perceptible performance degradations pertains to characterizing components in terms of three potential states (e.g., up, down, or troubled). These three states are described further herein below with particular reference to FIG. 4.

Figure 9:
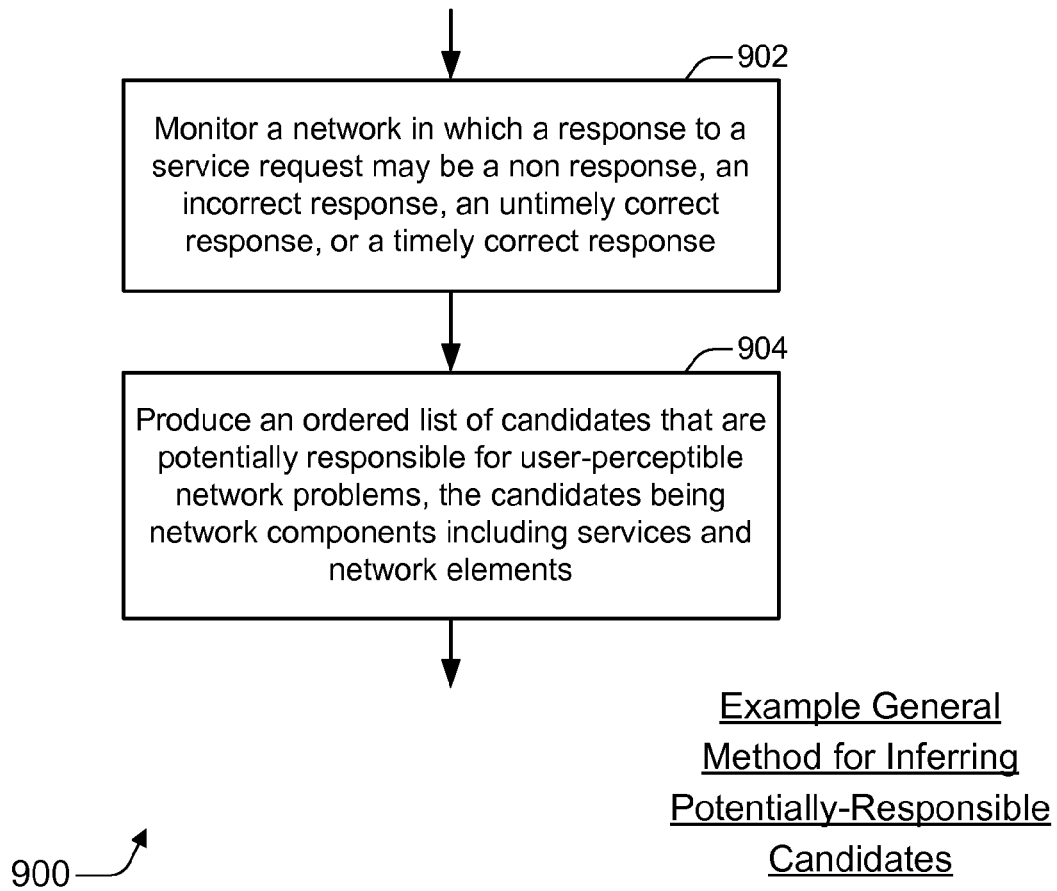
FIG. 9 is a flow diagram that illustrates an example of a general method for inferring potentially-responsible candidates.
Figure 10:
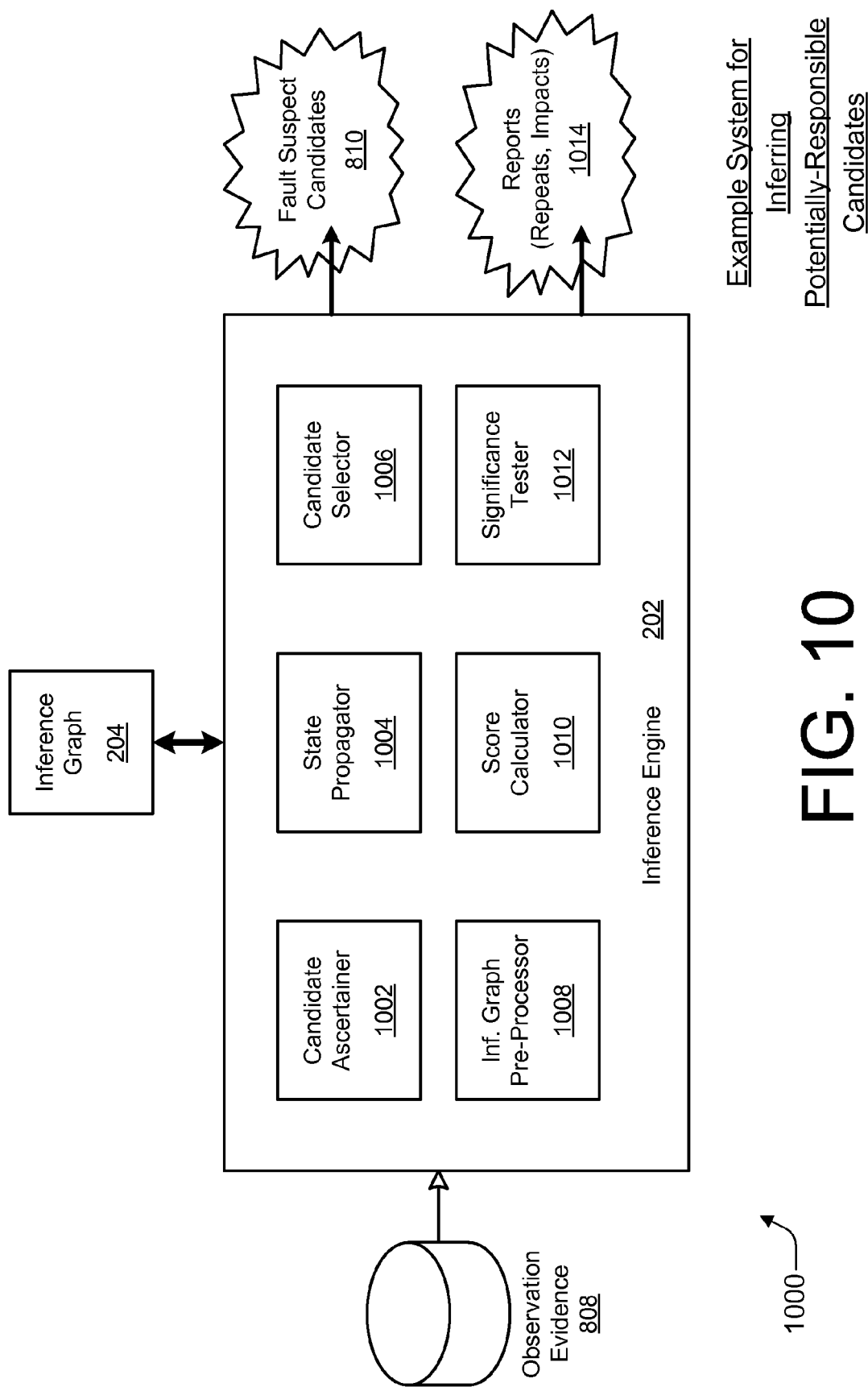
FIG. 10 is a block diagram illustrating an example system for inferring potentially-responsible candidates.

In the following sections, example general principles for inference systems and inference graphs are described with particular reference to FIGS. 1-8. FIGS. 9 and 10 are referenced to describe example general approaches for inferring potentially-responsible candidates. Relatively specific example implementations for inferring potentially-responsible candidates using inference graphs are described with particular reference to FIGS. 11-13. A general device that may be used to implement embodiments for inferring potentially-responsible candidates is described with reference to FIG. 14.

Example Embodiments for Inferring
Potentially-Responsible Candidates

1: Introduction—Example Environments and
Overview

FIG. 1 is a block diagram of an example network 100 that may be used in conjunction with inferring potentially-responsible candidates. As illustrated, network 100 includes multiple servers 102, multiple clients 104, and multiple network elements 106. Specifically, three servers 102a, 102b, and 102c; two clients 104a and 104b; and six network elements

106a, 106b, 106c, 106d, 106e, and 106f are shown and identified by reference numeral. As indicated by the ellipses, a network 100 may include more (or fewer) components than those that are illustrated in FIG. 1; also, the components may be arranged in different topologies.

In an example embodiment, each of servers 102 participates in providing one or more services. A service is some functionality provided by one or more endhosts. A service may be defined within a network and/or for a given inference system embodiment in any manner. By way of example, a service may be defined as an (IPaddress, port) pair. However, many alternative definitions of a service are possible. For example, a service may be defined as all of the messages sent and received by processes with a particular name or executable running on endhost(s). As another example, a service may be defined as the messages recognized by a packet parser (such as NetMon, Ethereal, WireShark, etc.) as part of the same protocol suite or application (e.g., Hyper Text Transfer Protocol (HTTP), Network Time Protocol (NTP), NETBIOS, Remote Procedure Call (RPC), Server Message Block (SMB), etc.). An inference system may also use any combination of such definitions as a service. Each client 104 is an endhost that may request a service from a server 102. Network elements 106 may be machines such as routers and switches (e.g., network elements 106a,b,c) or links such as wireless or wired transmission media (e.g., network elements 106d,e,f). An example taxonomy for network components that further elaborates on the terminologies of and interrelationships between these components is described further herein below with particular reference to FIG. 3.

Figure 2:
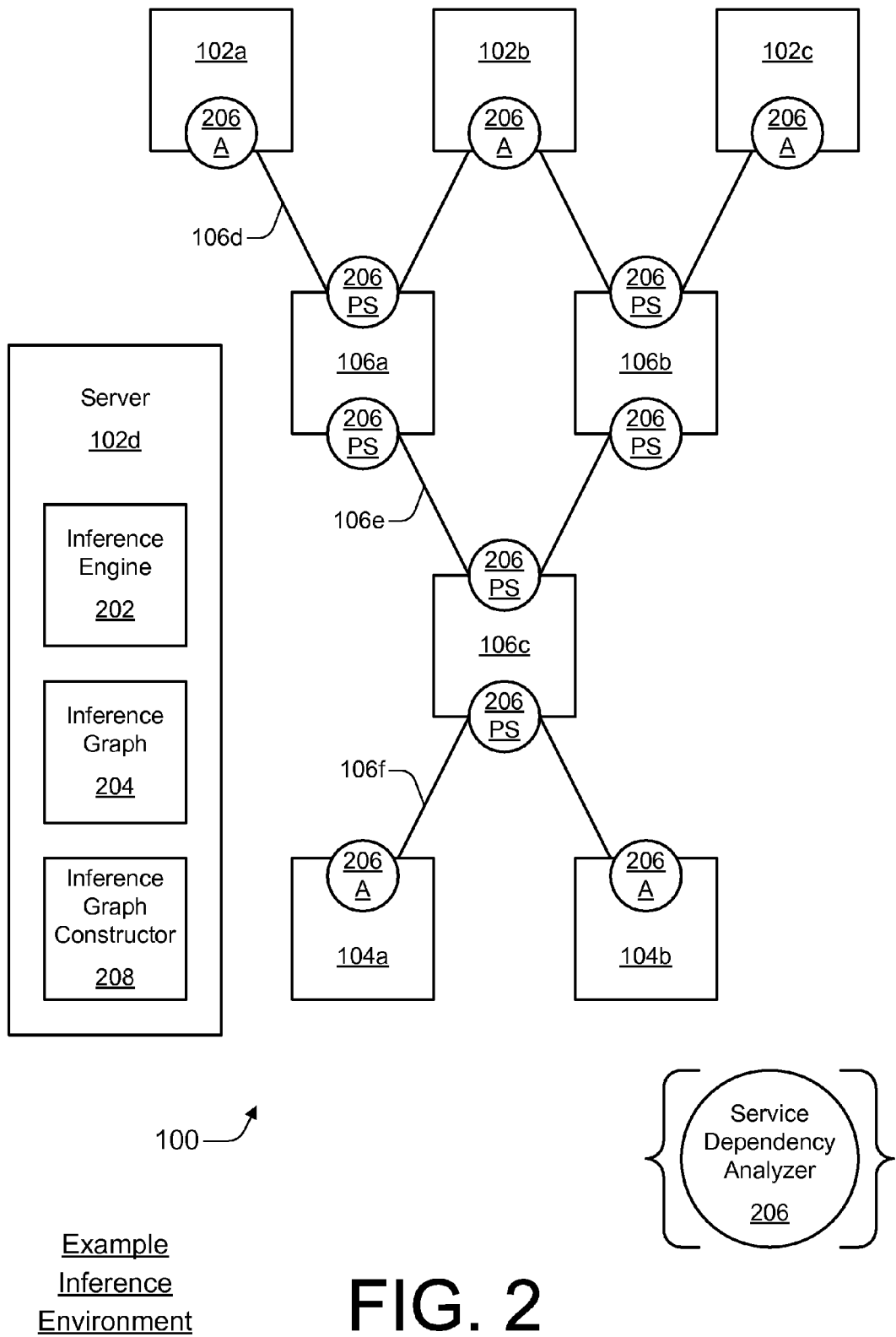
FIG. 2 is a block diagram of a network that illustrates an example inference environment for inferring potentially-responsible candidates.

FIG. 2 is a block diagram of network 100 illustrating an example environment for inferring potentially-responsible candidates. As illustrated, network 100 includes servers 102a-c, clients 104a-b, and network elements 106a-f. Network 100 also includes in FIG. 2 a server 102d, an inference engine 202, an inference graph 204, multiple service dependency analyzers 206, and an inference graph constructor 208. A service dependency analyzer 206 is realized as a service dependency analyzer agent 206A when it is implemented at endhosts such as servers 102 or clients 104. A service dependency analyzer 206 is realized as a service dependency analyzer packet sniffer 206PS when it is implemented at network elements 106 such as routers and switches. It should be understood that a service dependency analyzer packet sniffer 206PS may also be implemented at, including proximate to, the endhosts as well as the network elements. It should be noted that an inference graph can be constructed without using packet sniffers 206PS (e.g., by using agents 206A) and vice versa, as well as by using both packet sniffers 206PS and agents 206A. Other alternative embodiments for service dependency analyzers 206 may also be implemented.

In an example embodiment of inference systems generally, inference graph constructor 208 constructs an inference graph 204 at server 102d. A portion of an example inference graph 208 is described herein below with particular reference to FIG. 6. An inference engine 202 may use a constructed inference graph 204 to probabilistically determine at least one likely cause of one or more user-perceivable network problems. Although shown in FIG. 2 as being located at a single server 102d, inference engine 202 and inference graph constructor 208 may be implemented in alternative manners. For example, their operation and/or the construction of inference graph 204 may be effectuated in a distributed manner, such as at all or a portion of service dependency analyzers 206, at servers 102, at clients 104, some combination thereof, and so forth. Also, although shown separately in FIG. 2, any of inference engine 202, service dependency analyzers 206, and/or inference graph constructor 208 may be integrated together into fewer total units or may be separated into a greater number of modular units.

As is introduced above and described further herein below, network dependencies may be inferred at least partly by monitoring messages that are communicated between endhosts. These messages are monitored by obtaining packet traces for packets communicated between the endhosts. Service dependency analyzers 206 are responsible for obtaining packet traces for the packets that are exchanged between the endhosts. In short, network dependencies may be captured based on monitored messages with the obtained packet traces. Service-level dependency graphs may be built from the captured dependencies, and an inference graph may be constructed using the service-level dependency graphs. Inferring potentially-responsible candidates using a constructed inference graph is described herein below with particular reference to FIGS. 9-13.

Figure 3:
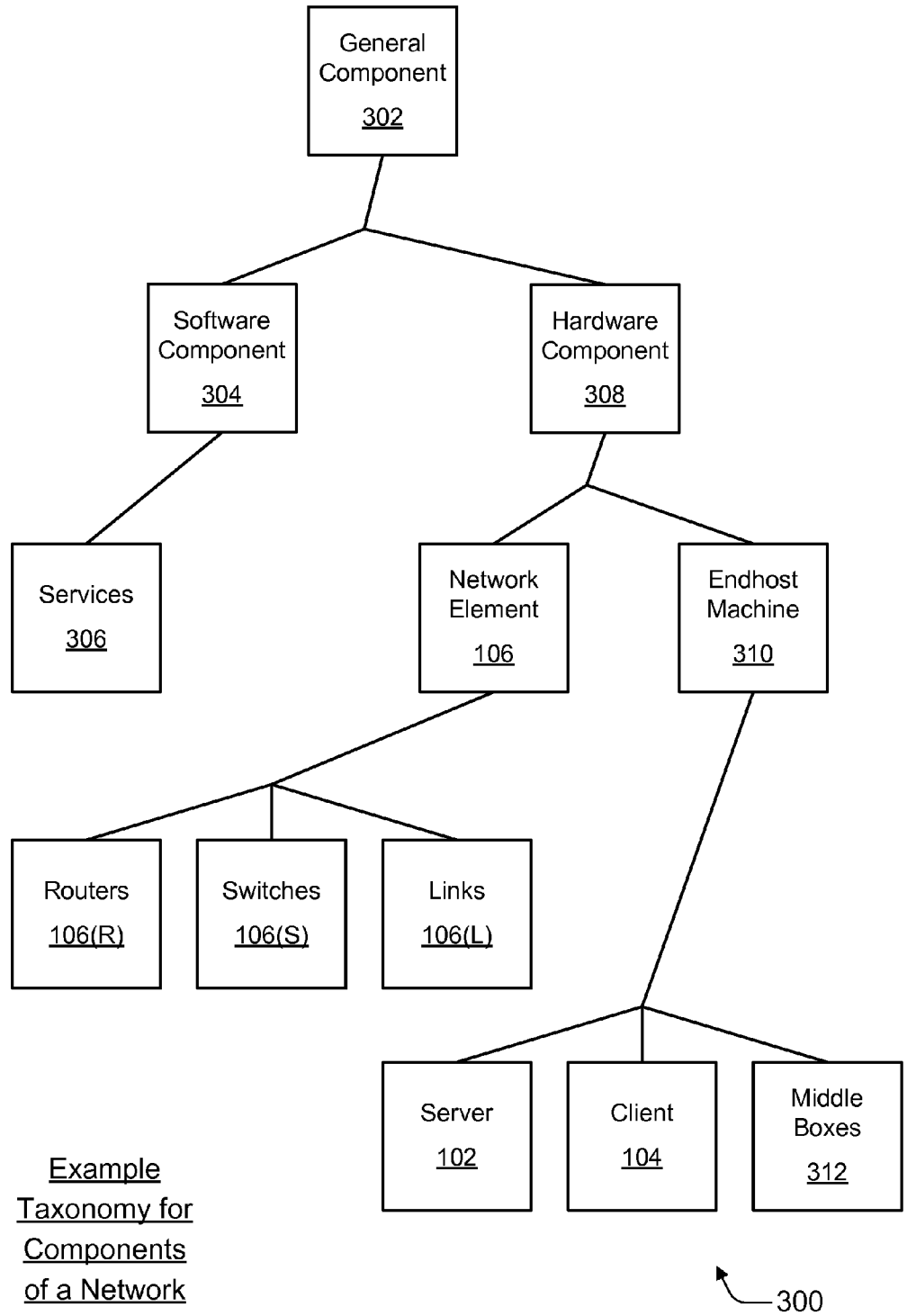
FIG. 3 illustrates an example taxonomy for components of a network.

FIG. 3 illustrates an example taxonomy 300 for components of a network, such as network 100. Example taxonomy 300 indicates that network 100 is formed from multiple general components 302. General components 302 may be, for example, software components 304 or hardware components 308. An example of a relevant software component 304 is one or more services 306, including the applications that execute on devices to provide the services. A service 306 may be implemented by software that is running on one, two, or more endhosts.

Hardware components 308 may be realized as one or more devices, an example of which is described herein below with particular reference to FIG. 14. Examples of hardware components 308 include network elements 106 and endhost machines 310. Examples of network elements 106 include routers 106(R), switches 106(S), and links 106(L). Examples of endhost machines 310 include servers 102, clients 104, and middle boxes 312. Other alternative components, which are not specifically illustrated, may also fit into component taxonomy 300. For instance, a hub may be a network element 106.

Figure 4:
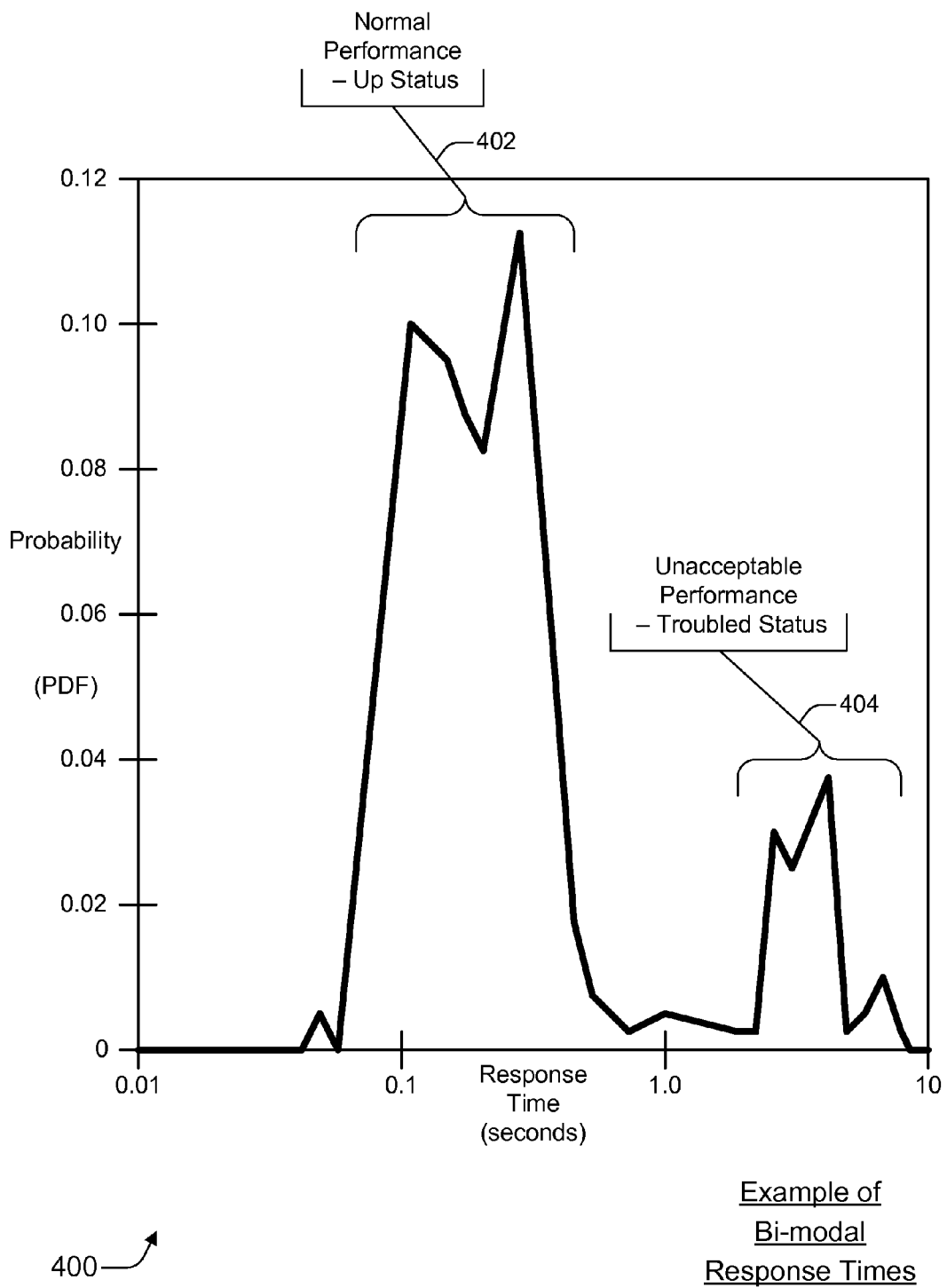
FIG. 4 is a graph that illustrates an example of bi-modal response times for a request.

FIG. 4 is a graph 400 that illustrates an example of bi-modal response times for a request. Graph 400 includes a horizontal abscissa axis that shows response times logarithmically from 0.01 to 10 and a vertical ordinate axis that shows probabilities from 0 to 0.12 (0 to 12%). Graph 400 illustrates a distribution of times consumed while clients fetched the home page from a major web server of a large enterprise. The distribution is plotted from a data set of 18,000 samples from 23 instrumented clients over a period of 24 days in a large enterprise network that includes tens of thousands of network elements and over four hundred thousand endhosts.

As is apparent from a review of graph 400, the times are bi-modal. Thirteen percent of the requests take 10× longer than normal, which results in user-perceptible lags of 3 to 10+ seconds. As is shown at 402, the first response time mode is indicated to be that the service is considered up with a normal performance. As is shown at 404, the second response time mode is indicated to be that the service is considered troubled with an unacceptable performance.

Conventional network management systems treat each service as being either up or down. This relatively naive model hides the kinds of performance degradations evidenced by the second response time mode at 404 of graph 400. To account for these types of lengthy delays that can qualify as user-perceptible network problems, certain example embodiments of the inference system model service availability as a tri-state value. This tri-state value for a service can be: up when its response time is normal; down when requests result in an error status code or no response at all; and troubled when responses fall significantly outside of normal response times. A response may be considered to fall significantly outside of normal response times when it is an order of magnitude greater than normal, when it exceeds a few seconds, when it is sufficiently long so as to annoy or inconvenience users, when it fails to meet a targeted temporal performance goal but does provide a correct response, some combination thereof, and so forth. Thus, a service may be assigned a troubled status when only a subset of service requests is performing poorly.

2: Example Aspects of Embodiments Using an Inference Graph

In an example embodiment, an inference graph is a labeled, directed graph that provides a unified view of the dependencies in a network, with the graph spanning both service and hardware network components. The structure of the dependencies is multi-level.

2.1: Example Inference Graph Aspects

Figure 5:
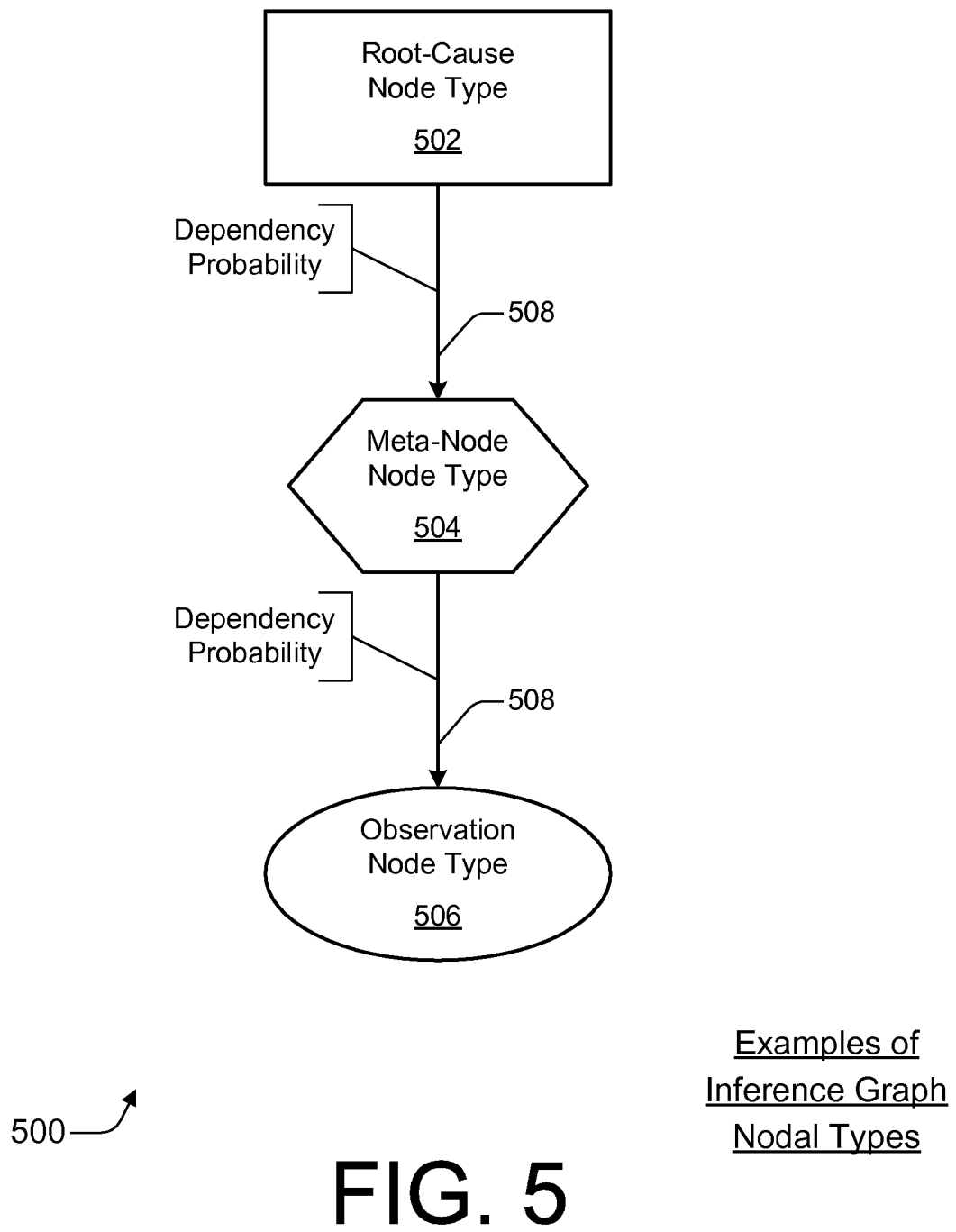
FIG. 5 is a block diagram of three example nodal types for an inference graph.

FIG. 5 is a block diagram 500 of three example nodal types 502-506 for an inference graph. As illustrated, diagram 500 includes a root-cause node type 502, a meta-node type 504, and an observation node type 506. For visual clarity, root-cause node types 502 are shown as rectangles, meta-node types 504 are shown as hexagons, and observation node types 506 are shown as ovals. Edges 508 interconnect the various nodes. Each edge 508 may be associated with a dependency probability. Dependency probabilities are described further below.

Thus, in an example embodiment, nodes in an inference graph are of three types 502, 504, and 506. First, root-cause nodes 502 correspond to physical components or services whose failure can cause an end-user to experience failures (e.g., a network problem such as a performance degradation, a hard fault, etc.). The granularity of root-cause nodes may be a computer (e.g., a machine with an IP address), a router or an IP link, and so forth. Alternatively, implementations of an inference system may employ root causes having a finer granularity.

Second, observation nodes 506 represent accesses to network services whose performance can be measured by the inference system. There can be a separate observation node for each client that accesses any such network service. The observation nodes thus model a user's experience when using services on the network. Observation nodes 506 can also represent other measurements made of components in the network. For example, an observation node can represent the utilization of a network link: reporting an up state when the link utilization is below 50%, reporting a troubled state when the link utilization is above 50%, and reporting a down state when the link is down. Thus, each observation node may correspond to at least one measurable quantity of the network. Examples of measurable quantities include, by way of example but not limitation, response time, link utilization, rate or number of events, number of errors, machine room temperature, some combination thereof, and so forth.

Third, meta-nodes 504 act as glue between the root-cause nodes and the observation nodes. Three types of meta-nodes are described herein: noisy-max, selector, and fail-over. However, meta-nodes may have more, fewer, and/or different types. These meta-nodes model the dependencies between root causes and observations. Meta-nodes are described further herein below, especially in Section 2.2 "Probabilistic Modeling for Meta-Nodes".

The state of each node in an inference graph is expressed probabilistically by a three-tuple: $(P_{up}, P_{troubled}, P_{down})$ $P_{up}$ denotes the probability that the node is working normally. $P_{down}$ is the probability that the node has experienced a fail-stop failure, such as when a server is down or a link is broken. Third, $P_{troubled}$ is the probability that a node is troubled, as described herein above, wherein services, physical servers or links continue to function but users perceive relatively poor performance. The sum of $P_{up}+P_{troubled}+P_{down}=1$. It should be noted that the state of a root-cause node is independent of any other root-cause nodes in the inference graph and that the state of observation nodes can be predicted from the state of their ancestors.

An edge 508 from a node A to a node B in an inference graph encodes the dependency that node A has to be in an up or other state for node B to also be in the up or other state. In other words, an edge 508 from a node A to a node B indicates that the state of node A affects the state of node B. Equivalently, this indication can be expressed as the state of B depends on the state of A. Edges 508 may also be labeled with a dependency probability that encodes the strength of the dependency of B on A. Thus, an edge from a first node A to a second node B encodes a probabilistic dependency that indicates how likely it is that a state of the first node A affects a state of the second node B.

Not all dependencies need be equal in strength. For example, a client cannot access a file if the path(s) to the file server are down. However, the client may be able to access the file even when the DNS server is down if the file server name is resolved using the client's local DNS cache. Furthermore, the client may need to authenticate more (or less) often than resolving the server's name. To capture varying strengths of such dependencies, edges 508 in an inference graph are associated/labeled with a dependency probability (DP). A larger dependency probability indicates a stronger dependence.

Figure 6:
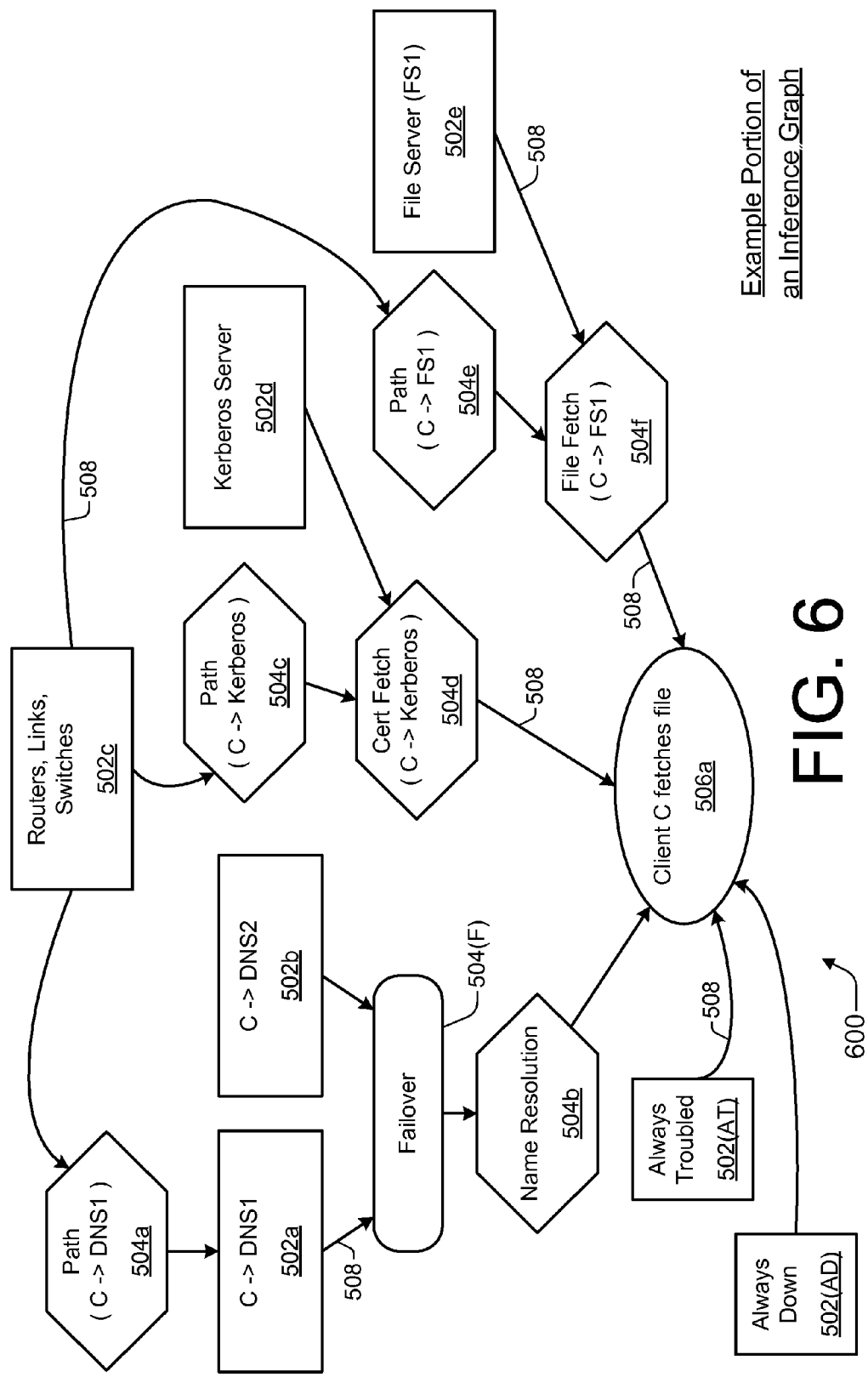
FIG. 6 is a block diagram of an example portion of an inference graph that reflects the dependencies involved when accessing a file share.

FIG. 6 is a block diagram of an example portion of an inference graph 600 that reflects the dependencies involved when accessing a network file share. The access to the file depends on contacting a Kerberos server for authentication, which in turn depends on the Kerberos server itself, as well as routers, switches, links, etc. on the path from the user's machine to the Kerberos server. A problem can occur anywhere in this chain of dependencies. These dependencies are modeled in an example framework of observation nodes, meta-nodes, and root-cause nodes that can be feasibly automated.

As illustrated, inference graph portion 600 (e.g., of an inference graph 204 (of FIG. 2)) includes a number of nodes and edges. Specifically, five root-cause nodes 502a-502e, six meta-nodes 504a-504f, one observation node 506a, and multiple edges 508 are shown. Only some of the edges are designated by the reference numeral 508 for the sake of visual clarity. Two special root-cause nodes 502(AT) and 502(AD) are also shown. Thus, rectangles represent physical components and the software services executing thereon, the oval represents an external observation, the hexagons model potential points of failure, and the square rectangles represent un-modeled or other external factors.

More specifically, in an example embodiment, each inference graph has two special root-cause nodes 502: always troubled 502(AT) and always down 502(AD). These special root-cause nodes 502(AT) and 502(AD) are to model external factors that might cause a user-perceived failure and that are not otherwise a part of the model. The state of the always troubled node 502(AT) is set to (0, 1, 0), and the state of the always down node 502(AD) is set to (0, 0, 1). An edge from each of these special root-cause nodes 502(AT) and 502(AD) is included to each of the observation nodes 506. Dependency probabilities may be assigned to these edges as follows. Root-cause nodes always troubled 502(AT) and always down 502 (AD) are connected to observation nodes 506 with a specialized probability of e.g. 0.001, which implies that 1 in 1000 failures is caused by a component that is not included in the model. Investigation has indicated that the results are usually insensitive to the precise probabilistic parameter setting, within this order of magnitude. Edges between a router and a path meta-node may use another specialized probability of e.g. 0.9999, which implies that there is a 1 in 10,000 chance that the network topology or traceroutes were incorrect and that the router is therefore not actually on the path.

In inference graph portion 600, the fetching of a file from a network file server by a user at client C is modeled. The user activity of "fetching a file" is encoded as an observation node 506a because the inference system can determine the response time for this action. In this example, fetching a file involves the user performing three actions: (i) authenticating itself to the network via Kerberos, (ii) resolving the DNS name of the file server via a DNS server, and (iii) accessing the file server. These actions themselves can also depend on other events and/or components to succeed. Consequently, these actions are modeled as meta-nodes 504b/d/f, and edges are added from each of them to the observation node 506a of "fetching a file".

Generally, parent nodes are recursively constructed for each meta-node 504, and corresponding edges are added until the associated root-cause nodes 502 are reached. Examples of meta-nodes 504 include: paths-between-endhost-machines meta-nodes 504a, 504c, and 504e; name resolution meta-node 504b; certificate fetch meta-node 504d; and file fetch meta-node 504f. Examples of root-cause nodes 502 include: DNS servers 502a and 502b; routers, switches, and links 502c on paths to the servers; the Kerberos authentication server 502d; and the targeted file server 502e. To model a failover mechanism in domain name resolution between the two DNS servers DNS1 and DNS2, a fail-over meta-node 504(F) is introduced.

It should be noted that FIG. 6 illustrates a portion 600 of an inference graph. Thus, a complete inference graph may include accesses made to other network services by the same user at client C as well as accesses to the illustrated file service (and other services) by other users at other clients in the network. Each access to a different service from an individual client and/or user may correspond to a separate observation node 506 in the complete inference graph.

2.2: Probabilistic Modeling for Meta-Nodes

With a probabilistic model, the states of parent nodes probabilistically govern the state of a child node. For example, suppose a child has two parents, A and B. The state of parent A is (0.8, 0.2, 0), i.e. its probability of being up is 0.8, troubled is 0.2, and down is 0. The state of parent B is (0.5, 0.2, 0.3). A question then is: what is the state of the child? While the probability dependencies of the edge labels encode the strength of the dependence, the nature of the dependency is encoded in the meta-node. For an example embodiment, the meta-node provides or describes the state of the child node given the state of its parent nodes (and the relevant dependency probabilities).

Figure 7A:
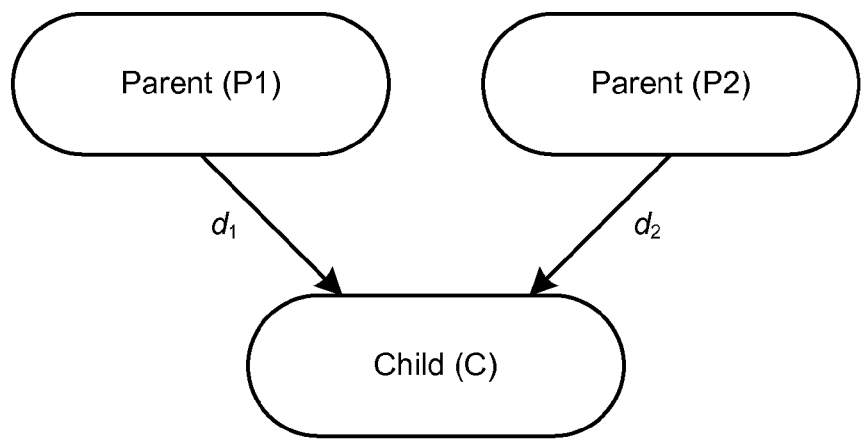
FIGS. 7A-7C illustrate three different example versions of a meta-node inference graph nodal type.
Figure 7B:
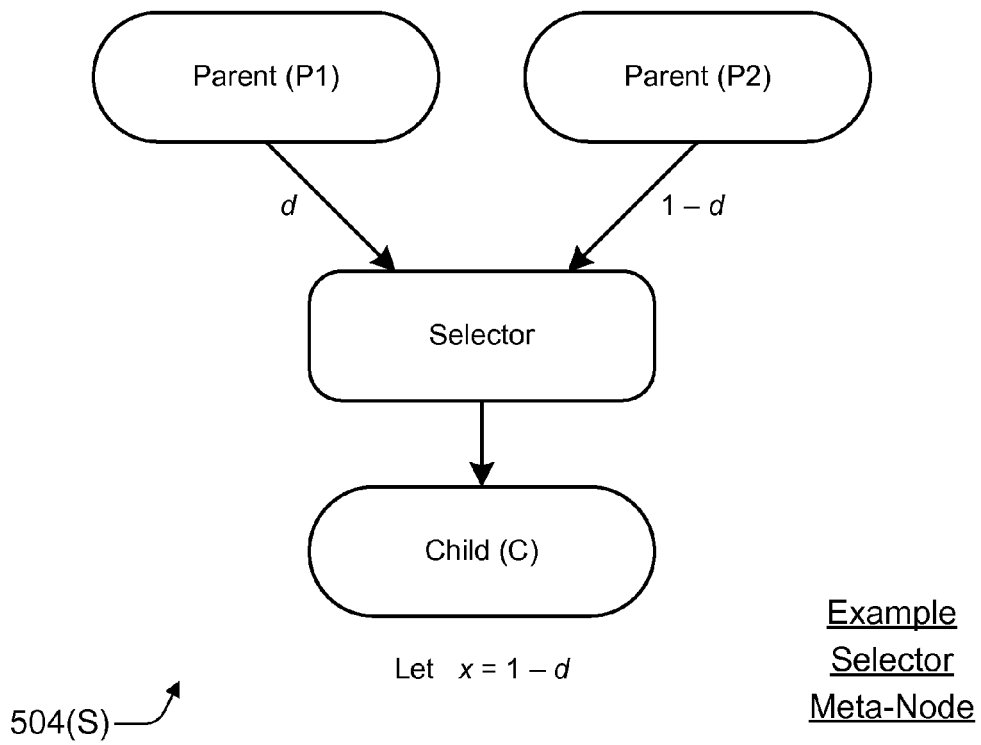
Figure 7C:
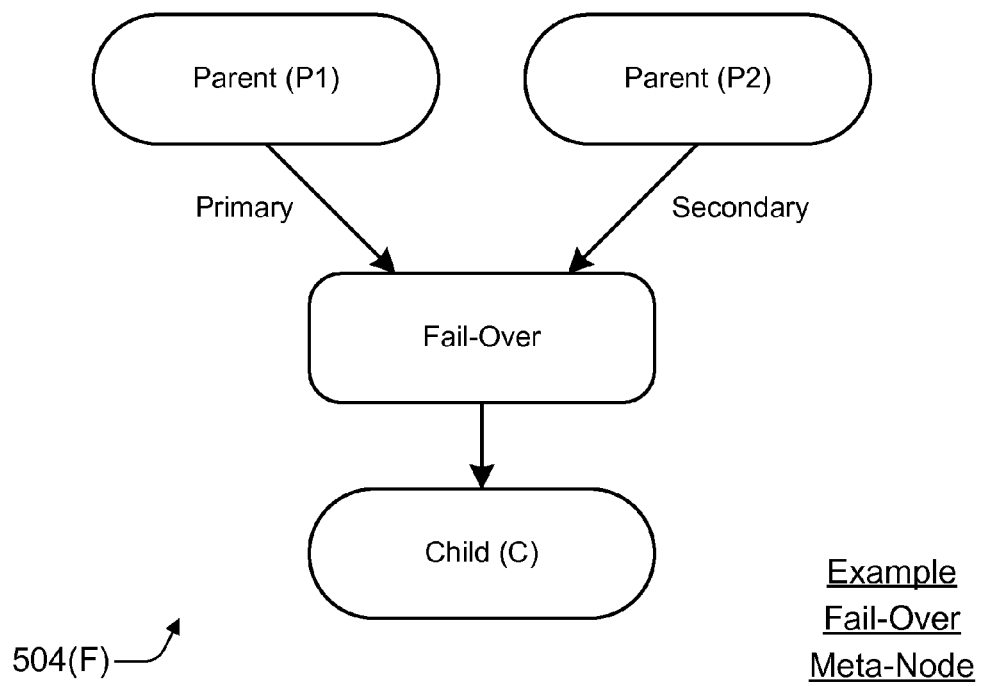

FIGS. 7A-7C illustrate three different example versions of a meta-node inference graph nodal type 504 (from FIG. 5). FIG. 7A illustrates an example noisy-max meta-node 504(N). FIG. 7B illustrates an example selector meta-node 504(S). FIG. 7C illustrates an example fail-over meta-node 504(F). Example embodiments for each of these meta-nodes 504(N), 504(S), and 504(F) are described below. Although each meta-node 504 is shown as having exactly two parents, each may alternatively have a different number of parents.

With reference to FIG. 7A, noisy-max meta-node 504(N) includes two parents: parent P1 and parent P2. It also includes a child C as well as two dependency probabilities: $d_1$ and $d_2$. The following variable assignments are given: $x=1-d_1$ and $y=1-d_2$. Noisy-max meta-node 504(N) may be understood conceptually as follows. "Max" implies that if any of the parents are in the down state, then the child is down. If no parent is down and any parent is troubled, then the child is troubled. If all parents are up, then the child is up. "Noise" implies that the dependency probability on the edge dictates the likelihood with which a parent's state affects the child's state. If the edge's weight is d, then the child is not affected by its parent with probability (1−d). Thus, noisy-max combines the notions of both "noisy" and "max".

Table 1 below presents a truth table for a noisy-max meta-node 504(N) when a child has two parents. Each of the two parents P1 and P2 can be up, troubled, or down. This results in a 3×3 grid as follows:

TABLE 1

Noisy-Max Meta-Node Truth Table.

| Noisy-Max | P1 Up | P1 Troubled | P1 Down |
|---|---|---|---|
| P2 Up | 1, 0, 0 | x, 1 − x, 0 | x, 0, 1 − x |
| P2 Troubled | y, 1 − y, 0 | xy, 1 − xy, 0 | xy, x(1 − y), 1 − x |
| P2 Down | y, 0, 1 − y | xy, (1 − x)y, (1 − y) | xy, 0, 1 − xy |

Each entry in the truth table of Table 1 is the state of the child, i.e. its probability of being up, troubled, or down when parent P1 and parent P2 have states as per the column and row labels, respectively. For instance, a troubled label for parent P1 implies that its state is (0, 1, 0). As an example of the truth table grid, the second row and third column of the truth table can be used to determine the probability of the child being troubled, given that parent P1 is down and parent P2 is troubled (P(Child=Troubled|ParentP1=Down, ParentP2=Troubled)) is $(1-d_1)*d_2$. To explain this intuitively, the child will be down unless parent P1's state is masked by noise (prob $1-d_1$). Further, if both parents are masked by noise, the child will be up. Hence, the child is in the troubled state only when parent P1 is drowned out by noise and parent P2 is not. Other grid entries can be similarly understood.

With reference to FIG. 7B, selector meta-node 504(S) includes two parents (parent P1 and parent P2), a child C, and two dependency probabilities (d and 1−d). It also includes a "Selector" indicator block. The following variable assignment is given: x=1−d. The selector meta-node is used to model load balancing scenarios. For example, a network load balancer (NLB) in front of two servers may hash the client's request and distribute requests evenly to the two servers. Attempting to model this scenario using a noisy-max meta-node does not produce a correct result. With a noisy-max meta-node, the child would depend on each server with a probability of 0.5 because half the requests go to each server. Thus, the noisy-max meta-node would assign the client a 25% chance of being up even when both the servers are troubled, which is clearly not accurate.

Generally, the selector meta-node can be used to model a variety of NLB schemes. For example, selector meta-nodes can model NLB servers, equal cost multipath (ECMP) routing, and so forth. ECMP is a commonly-used technique in enterprise networks in which routers send packets to a destination along several paths. A path with ECMP may be selected based on the hash of the source and destination addresses in the packet.

Table 2 below presents a truth table for a selector meta-node 504(S) when a child has two parents. Each of the two parents P1 and P2 can be up, troubled, or down. A child node selects parent P1 with probability d and parent P2 with probability 1−d. The child probabilities for the selector meta-node are as presented in Table 2 below:

TABLE 2

Selector Meta-Node Truth Table.

| Selector | P1 Up | P1 Troubled | P1 Down |
|---|---|---|---|
| P2 Up | 1, 0, 0 | x, 1 − x, 0 | x, 0, 1 − x |
| P2 Troubled | 1 − x, x, 0 | 0, 1, 0 | 0, x, 1 − x |
| P2 Down | 1 − x, 0, x | 0, 1 − x, x | 0, 0, 1 |

The grid entries in the selector meta-node truth table above express the selection made by the child. For example, if the child may choose each of the parents with an equal probability of 50%, selector meta-node 504(S) causes the child to have a zero probability of being up when both its parents are troubled. This is discernable from the first number "0" in the P2 troubled row, P1 troubled column entry.

With reference to FIG. 7C, fail-over meta-node 504(F) includes two parents (parent P1 and parent P2), a child C, and two edge labels (primary and secondary). It also includes a "Fail-over" indicator block. Fail-over meta-nodes embrace the fail-over mechanisms commonly used in enterprise networks (e.g., with servers). Fail-over is a redundancy technique where clients access primary production servers and fail-over to backup servers when the primary server is inaccessible. Fail-over cannot be accurately modeled by either the noisy-max or selector meta-nodes because the probability of accessing the backup server depends on the failure of the primary server.

Table 3 below presents a truth table for a fail-over meta-node 504(F) when a child has two parents. Each of the two parents P1 and P2 can be up, troubled, or down. The truth table for the fail-over meta-node encodes the dependence when the child primarily contacts parent P1, but fails over to parent P2 when parent P1 does not respond. The child probabilities for the fail-over meta-node are as presented in Table 3 below:

TABLE 3

Fail-Over Meta-Node Truth Table.

| Fail-Over | P1 Up | P1 Troubled | P1 Down |
|---|---|---|---|
| P2 Up | 1, 0, 0 | 0, 1, 0 | 0.9, 0.1, 0 |
| P2 Troubled | 1, 0, 0 | 0, 1, 0 | 0, 1, 0 |
| P2 Down | 1, 0, 0 | 0, 1, 0 | 0, 0, 1 |

For a fail-over meta-node 504(F), as long as the primary server (parent P1) is up or troubled, the child is not affected by the state of the secondary server (parent P2). When the primary server is in the down state, the child has a high chance of being up if the secondary server is up. Also, in this case (primary down, secondary up) the child has a small chance of being troubled as it expends time accessing the primary server, which is down, before falling back to the secondary server. These permutations are reflected by the probabilities in Table 3. For example, if the primary server (parent P1) is down and the secondary server (parent P2) is up at the first row and third column, the (up, troubled, down) probabilities are (0.9, 0.1, 0).

Other versions of the truth tables of Tables 1, 2, and 3 may alternatively be implemented. For example, the P1 down, P2 up entry of the fail-over meta-node truth table may be (1, 0, 0) instead of (0.9, 0.1, 0). Additionally, it should be understood that the meta-nodes of an inference graph can be collapsed into other nodes in the graph. For example, with reference to FIG. 5, meta-node 504 may be incorporated into observation node 506 by incorporating the probability table for the meta-node 504 into the observation node 506.

2.3: Example Architecture for Inference System

Figure 8:
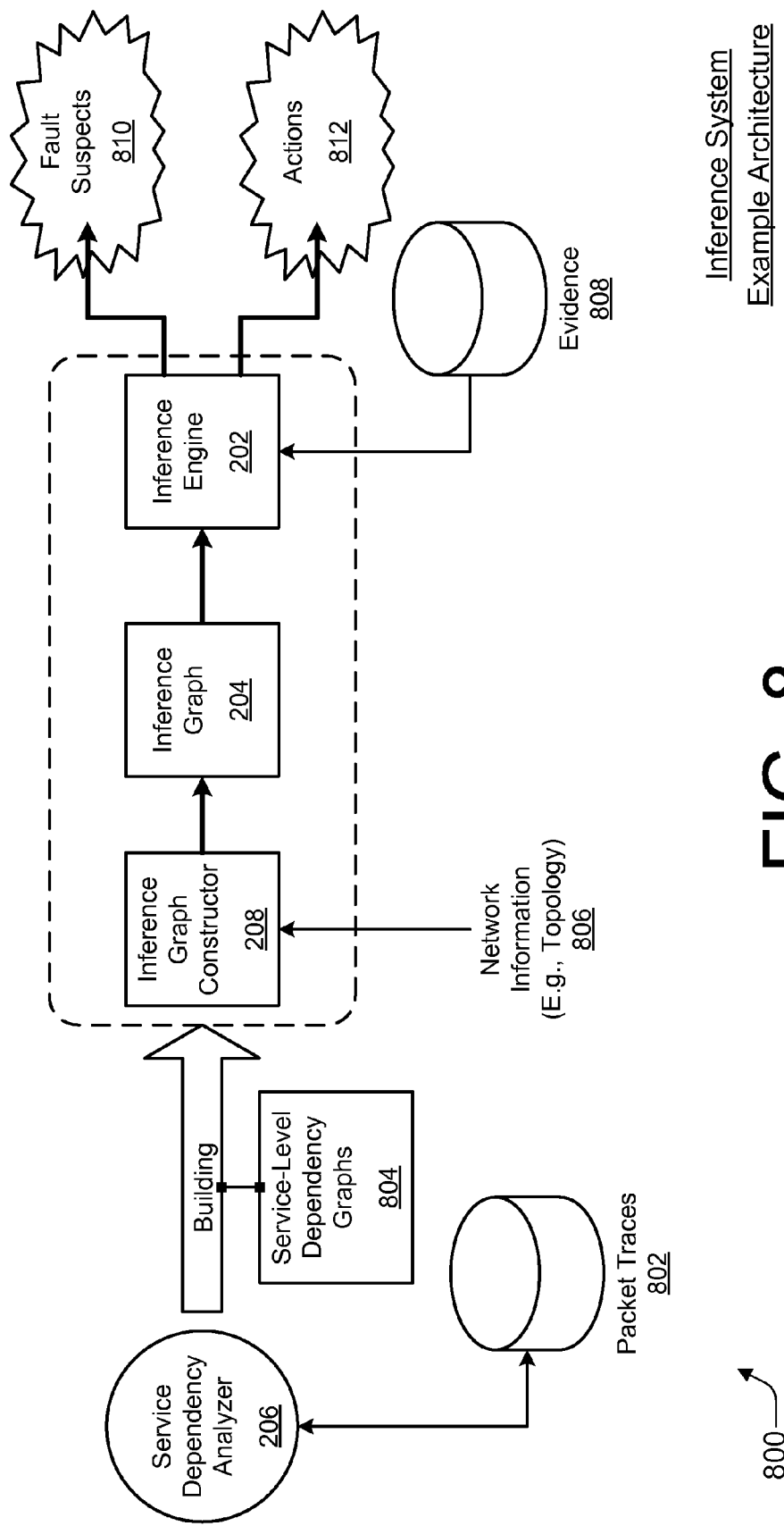
FIG. 8 is a block diagram illustrating an example inference system architecture.

FIG. 8 is a block diagram illustrating an example inference system architecture 800. As illustrated, inference system architecture 800 includes at least one service dependency analyzer 206, an inference graph constructor 208, an inference graph 204, and an inference engine 202 (each also of FIG. 2). Inference system architecture 800 further includes packet traces 802, service-level dependency graphs 804, network information 806, client evidence 808, fault suspects 810, and actions 812.

In an example embodiment, an inference system includes a centralized inference engine 202 and distributed service dependency analyzers 206. An inference system may be implemented without changing the routers or switches, the applications, and/or the middleware of a given enterprise or other institution. An inference system may be implemented in alternative manners.

Generally, an example inference system deployment that is capable of analyzing network symptoms and diagnosing network problems can implement a three-step process to localize faults in a network. First, each service dependency analyzer 206 is responsible for monitoring the packets sent from and received by one or more endhosts to obtain packet traces 802. Each service dependency analyzer 206 may run on an endhost itself (as an agent 206A), or it may obtain packet traces via sniffing a nearby link or router (as a packet sniffer 206PS). From these packet traces 802, each service dependency analyzer 206 computes the dependencies between the services with which its endhost(s) communicates and the response time distributions for each specified service. Each service dependency analyzer 206 builds service-level dependency graphs 804 from the computed service dependency information. The service-level information of these dependency graphs 804 is then relayed to inference graph constructor 208. Alternatively, service-level dependency graphs 804 may be built by inference graph constructor 208, and/or inference graph 204 may be constructed directly from the service-level dependency information.

Second, a network operator specifies the services that are to be monitored (e.g., by IP address and port number). Inference graph constructor 208 aggregates the dependencies between the services as computed by each of the service dependency analyzers 206 and may employ statistical procedures to detect false positives and/or false negatives. The former can be rejected and probabilistically-estimated values for either can be incorporated into the inference graph. Inference graph constructor 208 combines the aggregated dependency information with network information 806 (e.g., network topology information) to compute a unified inference graph 204. The unified inference graph 204 pertains to each of the service activities in which the operator is interested and represents information collected across each of the service dependency analyzers 206.

Third, ongoing client response time evidence 808 that is collected by service dependency analyzers 206 is provided to inference engine 202. Evidence 808 may also be client-server interaction logs; trouble tickets; Simple Network Management Protocol (SNMP) counters; event logs from clients, servers, or network elements (e.g., syslog); combinations thereof; and so forth. Inference engine 202 analyzes evidence 808 given the current inference graph 204. In other words, inference engine 202 applies the response time evidence observations 808 reported by service dependency analyzers 206 to inference graph 204 to attempt to identify fault suspects 810 (e.g., the root-cause node(s) for links, routers, servers, clients, etc.) that are responsible for any observed network problems. Inference engine 202 may also provide suggested actions 812 (e.g., running trace routes, analyzing a particular server, etc.) for remedying the network problems that are potentially caused by fault suspects 810. The first and second steps may be executed periodically or when triggered by a change in a dependency so as to capture and incorporate any changes in the network. The third step may be executed periodically, when requested by an operator, or when prompted by a service dependency analyzer 206 that is observing relatively longer response times.

3: Example Embodiments for Inferring Potentially-Responsible Candidates

Certain embodiments of the described inference system may be used by IT administrators, who usually care about rapidly localizing a problematic component within the network so that it can be quickly remedied. IT administrators would generally prefer to do so without requiring changes to existing network services and applications. An example described implementation for an inference system enables problematic network components to be localized using a relatively passive correlation approach.

In an example embodiment, a system employs an inference engine 202 (e.g., of FIGS. 2 and 8) that produces a list (e.g., an ordered list) of candidates that are potentially responsible for user-perceptible network problems. The candidates are network components 302 that may include both services 306 and network elements 106. With the inference engine, a response to a service request within a network may be: a non response, an incorrect response, an untimely correct response, and a timely correct response. The user-perceptible network problems include the non response, the incorrect response, and the untimely correct response.

In an example implementation, the inference engine may produce an ordered list of candidates using an inference graph that reflects cross-layer components including the services and the hardware components of the network. The inference graph includes multiple nodes with each node being associated with two or more possible states and corresponding to an actual state that is a probability distribution over the two or more possible states.

Further, the two or more possible states may include an up state, a down state, and a troubled state. The nodes in the up state correspond to the timely correct responses, and the nodes in the down state correspond to the non responses and the incorrect responses. The nodes in the troubled state correspond to the untimely correct responses.

FIG. 9 is a flow diagram 900 that illustrates an example of a general method for inferring potentially-responsible candidates. Flow diagram 900 includes two blocks 902-904. Implementations of flow diagram 900 may be realized, for example, as processor-executable instructions and/or as at least one inference engine 202 (of FIGS. 2, 8, and 10). More detailed example embodiments for implementing flow diagram 900 are described below with reference to FIGS. 10-13.

Figure 14:
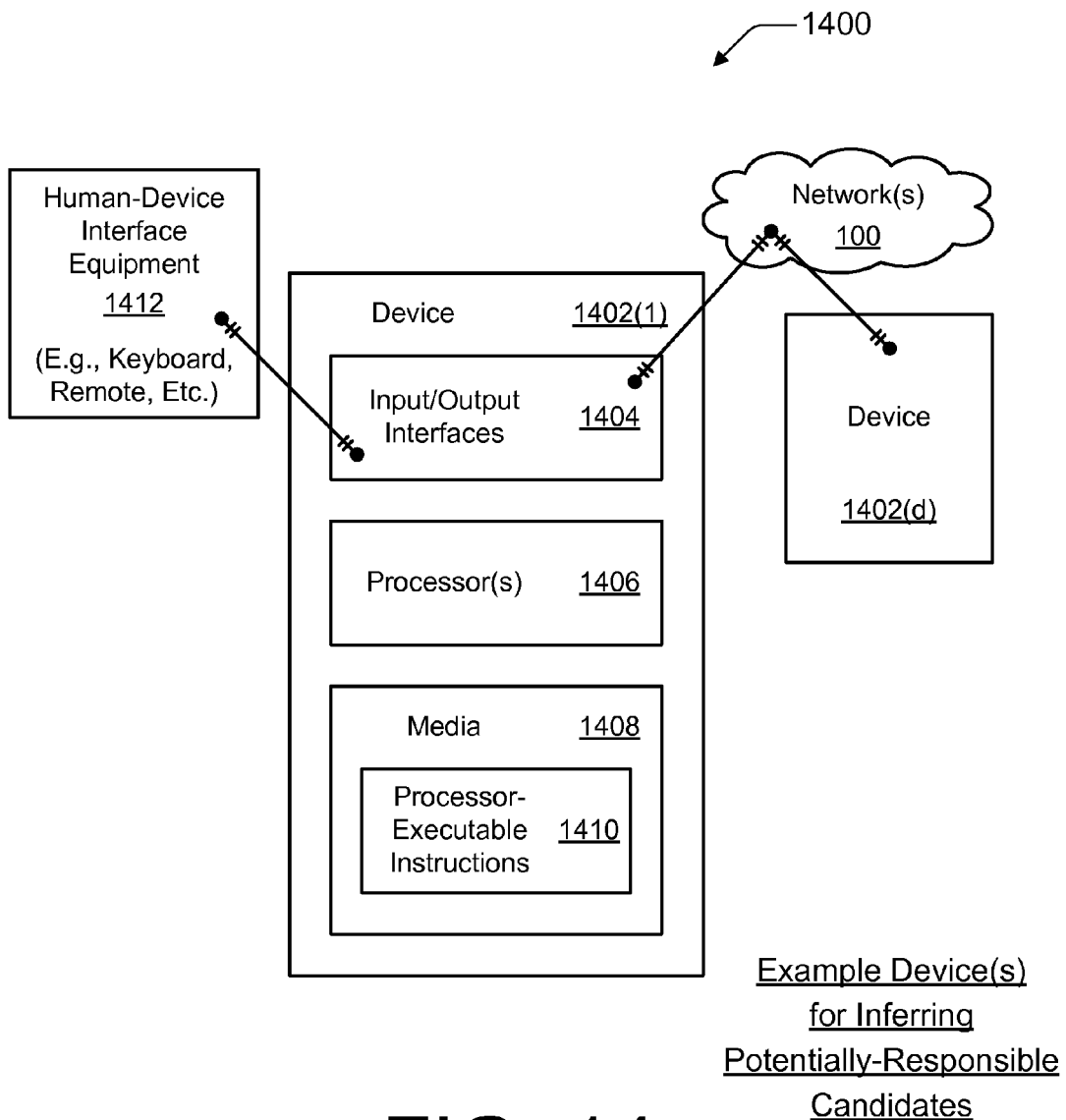
FIG. 14 is a block diagram of an example device that may be used to implement embodiments for inferring potentially-responsible candidates.

The acts of the flow diagrams that are described herein may be performed in many different environments and with a variety of devices, such as by one or more processing devices (e.g., of FIG. 14). The orders in which the methods are described are not intended to be construed as a limitation, and any number of the described blocks can be combined, augmented, rearranged, and/or omitted to implement a respective method, or an alternative method that is equivalent thereto. Although specific elements of other FIGS. are referenced in the descriptions of some of the flow diagrams, the methods may be performed with alternative elements.

In an example embodiment, at block 902 a network is monitored. In the monitored network, a response to a service request may be a non response, an incorrect response, an untimely correct response, or a timely correct response. For example, a network 100 may be monitored by an inference system 800 or 1000 (of FIGS. 8 and 10) by a service dependency analyzer 206 and/or inference engine 202.

At block 904, a list of candidates that are potentially responsible for user-perceptible network problems is produced. The candidates may be network components including both services and network elements. User-perceptible network problems correspond to the non response, the incorrect response, and the untimely correct response. For example, fault suspects 810 may be produced by an inference engine 202. The list may be ordered, for instance, by a confidence value.

In an example implementation, an ordered list of candidates may be produced using an inference graph that reflects cross-layer components including both the services and the hardware components of the network. The inference graph includes multiple nodes with each node being associated with two or more possible states and corresponding to an actual state that is a probability distribution over the two or more possible states.

3.1: Example General Approaches to Inferring Potentially-Responsible Candidates

FIG. 10 is a block diagram illustrating an example system 1000 for inferring potentially-responsible candidates. As illustrated, inference system 1000 includes an inference engine 202, an inference graph 204, and observation evidence 808. In an example embodiment, inference engine 202 includes the following six components: a candidate ascertainer 1002, a state propagator 1004, a candidate selector 1006, an inference graph pre-processor 1008, a score calculator 1010, and a significance tester 1012. Alternatively, other inference engine embodiments may have more, fewer, and/or different components.

Components of inference engine 202 may be realized as, for example, modules or other processor-executable instructions. In operation, inference engine 202 may produce fault suspect candidates 810 and reports 1014. Fault suspects 810 may be a list of candidates that are potentially-responsible for observed network evidence 808. Reports 1014 can report on repeated problem sources, on the impacts of network problems, and so forth. Thus, a report 1014 may include an identification of fault-inducing root-causes that are repeatedly likely to be responsible for user-perceptible network problems. Also, a report 1014 may include an indication of the impacts of a network problem.

A general algorithm for an example embodiment of an inference engine is described. This example algorithm uses an inference graph to localize the cause of a network problem with assignment vectors. An assignment vector is an assignment of state to each root-cause node in an inference graph. A root-cause node has a combined probability of 1.0 of being up, troubled, or down. An assignment vector might specify, e.g., that link1 is troubled, that server2 is down, and that each of the other root-cause nodes is up. For each assignment vector, the probability of the externally-observed values for each of the observation nodes is attempted to be computed.

To compute these probabilities, the root-cause nodes are set to the states that are specified by a given assignment vector. The state-propagation techniques for inference graphs that are described herein are used to propagate probabilities downwards until they reach the observation nodes. For each observation node, a node score is computed based on how well the probabilities for the state of a particular observation node agrees with the statistical evidence derived from the real-world measurements associated with the particular observation node. For example, the node scores may be computed by matching the propagated probability densities to the real-world observation evidence at these nodes.

In the following paragraphs, an example algorithm is described for an inference engine to back-track from a given observation or set of observations to find the assignment vector(s) that have the highest score(s) for that observation. This assignment vector (or vectors) represents the root-cause node(s) that are more, if not most, likely to be responsible for creating a user-perceptible network problem. If multiple assignment vectors are output, they may be ordered or ranked in accordance with a probabilistic confidence value.

In an example embodiment, an inference engine 202 takes as input an inference graph 204 and external evidence 808 that is associated with the observation nodes. The inference engine outputs a ranked list of assignment vectors ordered by a confidence value that represents how well each explains the current set of observational evidence. For example, an inference engine's output might be that server1 is troubled while other root-cause nodes are up with a confidence of 90%, that link2 is down while other root-cause nodes are up with a 5% confidence, and so forth.

With a large inference graph, there are potentially numerous assignment vectors. It can be temporally and computationally inefficient if not genuinely impracticable to search through all possible assignment vectors to determine the vector with the highest score. Theoretically, there are $3^r$ vectors given r root-causes. Applying the procedure described above in a brute force manner to evaluate an assignment vector score for each combination of root-causes might therefore be infeasible. Existing approaches to this type of problem in machine learning literature, such as loopy belief propagation, do not scale to the problem sizes encountered in enterprise networks. Existing approximate localization algorithms are significantly more efficient. However, they are based on two-level, two-state graph models; hence, they are not applicable to an inference graph that is a multi-level, multi-state graph and that may additionally include special meta-nodes to model various artifacts of an enterprise network.

For an example embodiment, the inference engine may use an approximate localization algorithm that builds on the following observation: Observation #1—It is very likely that at any point in time only a few root-cause nodes are troubled or down. In large enterprises, there are problems all the time, but they are usually not ubiquitous. (There are recognizable exceptions to this observation, such as rapid malware infection and propagation.) This observation is leveraged by not evaluating all $3^r$ possible assignment vectors. Instead, the inference engine concentrates its search on those assignments that have no more than a predetermined number k of root-cause nodes that are either troubled or down.

Thus, the inference engine first evaluates 2*r assignment vectors in which exactly one root-cause is troubled or down. It next evaluates $$2*2*\binom{r}{2}$$

assignment vectors in which exactly two root-causes are troubled or down, and so on. Given the predetermined maximum number k of faulty (e.g., failed or degraded) root-cause nodes, the inference engine therefore evaluates at most $(2*r)^k$ assignment vectors. With this approximation that is based on Observation #1, the approximation error of the inference engine decreases exponentially with k. (The approximation error may be considered to be the probability that the inference engine does not arrive at the "correct" solution, which is the same solution attained using the brute force exponential approach.) In fact, the approximation error becomes vanishingly small for k=4 and greater.

For an example embodiment, the inference engine may use another practical observation to speed up its computation: Observation #2—Because a root-cause node is assigned to be up in most assignment vectors, the evaluation of an assignment vector may focus on the re-evaluation of states at the descendants of root-cause nodes that are not up. In an example implementation, the inference engine pre-processes the inference graph by assigning all root-cause nodes to be in an up baseline state and propagating these up states through to the observation nodes. To evaluate an individual particular assignment vector, the inference engine can focus on the change to states of the affected root-cause nodes and their descendants.

Thus, the inference engine can operate in response to the realization that the nodes that are descendants of root-cause nodes that are troubled or down in the current assignment vector are to be re-evaluated, or, conversely, by focusing on those observation nodes having a state change to at least one ancestral node. The inference engine can therefore selectively update these nodes of the inference graph while leaving the vast majority of the nodes in the inference graph unchanged and in their baseline states. After computing a particular score for a particular assignment vector, the inference engine rolls the inference graph back to the pre-processed state with all root-causes being given as being in the up state. As there are not more than k root-cause nodes that change state out of the hundreds of root-cause nodes in a typical inference graph for an enterprise network (when used in conjunction with Observation #1), this technique that is based on Observation #2 can reduce the inference engine's time to localize a network problem by up to 100× without sacrificing accuracy.

The techniques that are based on Observations #1 and #2 may be used individually or together. It is also noted that different root-causes may have different probabilities of being troubled or down. For example, links in enterprise networks may have a much higher chance of being congested or troubled than of being actually down. IT administrators often have this knowledge through long-term management of their network. When available, this specialized domain knowledge may be incorporated into the probabilistic inference graph model to further improve the accuracy of the inference engine in distinguishing between various root causes. For example, this information can be used as the a priori probability of the up, down, and troubled states for each root cause. This information can also be used to decrease the time taken to compute fault suspect candidates by ordering the assignment vectors in decreasing order of a priori probability and evaluating the most likely candidate vectors first.

Using Observations #1 and #2 can dramatically reduce the time involved in analyzing an inference graph to infer potentially-responsible candidates. Observation #1 can reduce the total number of candidate assignment vectors under consideration. Observation #2 can reduce the total number of probability states that are propagated for each candidate assignment vector. However, propagating probabilistic states from root-cause nodes down to observation nodes can still be computationally expensive. The following paragraphs describe an example approach to accelerating the state propagation.

When employing probabilistic meta-nodes, computing the probability density for a child with n parents can take $O(3^n)$ time in a three-state model in the general case. In other words, the naive way to compute the probability of a child's state involves computing all $3^n$ entries in the truth-table and summing the appropriate entries. However, the majority of the nodes with more than one parent in inference graphs as described herein tend to be noisy-max meta-nodes. As noted above, meta-nodes of the inference graph are to model dependencies between the observation nodes and the root-cause nodes.

In an example embodiment, child state computations for noisy-max meta-nodes may be accelerated using the following equations. For these nodes, the following equations reduce the computation to linear time in the number of parents. These equations also explicitly generalize the noisy-max meta-node model described above to when a child might have more than two parents. These equations are directed to probability computations for when a child is up, down, and troubled, respectively:

$$P(\text{child up}) = \prod_j ((1 - d_j) * (p_j^{trouble} + p_j^{down}) + p_j^{up})$$

$$1 - P(\text{child down}) = \prod_j (1 - p_j^{down} + (1 - d_j) * p_j^{down})$$

$$P(\text{child troubled}) = 1 - (P(\text{child up}) + P(\text{child down}))$$

where $p_j$ is the j'th parent, $d_j$ is the dependency probability, and $(p_j^{up}, p_j^{trouble}, p_j^{down})$ is the probability distribution of $p_j$.

The first equation implies that a child is up only when it does not depend on any parents that are not up. The second equation implies that a child is down unless every one of its parents are either not down or the child does not depend on them when they are down. In other words, in accordance with the equations above, the probabilistic states for noisy-max meta-nodes of the inference graph may be propagated in linear time for a given number of parents responsive to a product of respective probabilistic values corresponding to each respective parent. Each respective probabilistic value is based on the up, down, and troubled probabilities of the corresponding respective parent.

As noted above, probabilistic states for selector meta-nodes and fail-over meta-nodes of the inference graph may also be propagated downward toward observation nodes. The selector meta-nodes correspond to the load balancing infrastructure of the network, and the fail-over meta-nodes correspond to the redundancy mechanisms of the network. The computational cost for propagating selector meta-nodes and fail-over meta-nodes is still exponential, $3^n$ for a node with n parents. However, experience indicates that these two types of meta-nodes typically have no more than n=6 parents. They therefore are not likely to add a significant computational burden when analyzing the inference graphs of most networks.

After probabilistic states have been propagated down to the observation nodes, a scoring mechanism is implemented to compare observed evidence at the observations nodes with the probability distributions for the observation nodes. In an example embodiment, the inference engine therefore implements a scoring function to compute how well an assignment vector that is being evaluated matches external evidence. Any number of scoring functions may be implemented in an inference system. In an example implementation, a scoring function takes as input the probability distribution of a particular observation node and the external evidence for the particular observation node. It returns a value between zero and one, with a higher value indicating a better match.

An example scoring function may be implemented as follows: The node scoring for when an observation node returns an error (or experiences another incorrect response) or receives no response is straight forward—the score is set to the computed probability of the observation node being down. In other words, if the assignment vector correctly predicts that the observation node has a high probability of being down, then the node score thereof is high.

The node scoring for when an observation returns a response time for a correct response proceeds as follows. The response can be a timely or an untimely correct response, both of which are successful in one sense. For such successful responses, the service dependency analyzer tracks the history of response times. The service dependency analyzer and/or the inference engine fits two Gaussian distributions (or other statistical model) to the empirical data.

In an example implementation, these two Gaussian distributions are termed $Gaussian_{up}$ and $Gaussian_{troubled}$. For example, the distribution in FIG. 4 would be modeled by $Gaussian_{up}$ with mean 200 msec at normal performance indicator 402 and $Gaussian_{troubled}$ with mean 2 sec at unacceptable performance indicator 404. If the observation node sees a response time t, the score of an assignment vector that predicts the observation node state to be $(p_{up}, p_{troubled}, p_{down})$ is $p_{up}*\text{Prob}(t|Gaussian_{up})+p_{troubled}*\text{Prob}(t|Gaussian_{troubled})$. In words, if the response time t is well explained by the up Gaussian and the assignment vector correctly predicts that the observation node has a high probability of being up, a high score would be assigned to the assignment vector.

With reference to FIG. 10, in an example embodiment, an inference system 1000 employs an inference engine 202 that produces fault suspect candidates 810 (e.g., in an ordered list) that are potentially responsible for user-perceptible network problems. The candidates are network components 302 that may include both services 306 and network elements 106 (of FIGS. 1-3). With inference engine 202, a response to a service request may be: a non response, an incorrect response, an untimely correct response, and a timely correct response. The user-perceptible network problems include the non response, the incorrect response, and the untimely correct response.

In an example implementation, inference engine 202 may produce fault suspect candidates 810 using inference graph 204 that reflects cross-layer components including the services and the hardware components of a network. Inference graph 204 includes multiple nodes with each node being associated with two or more possible states and corresponding to an actual state that is a probability distribution over the two or more possible states.

Inference graph 204 may include at least three different types of nodes: root-cause nodes 502, observation nodes 506, and meta-nodes 504 (all of FIG. 5). As described further herein above, the root-cause nodes correspond to the hardware components or the services whose failure or degradation can cause the user-perceptible network problems. The observation nodes represent accesses to the services of the network, and the meta-nodes model dependencies between the observation nodes and the root-cause nodes.

As illustrated in FIG. 10 for an example embodiment, inference engine 202 includes candidate ascertainer 1002, state propagator 1004, candidate selector 1006, inference graph pre-processor 1008, score calculator 1010, and significance tester 1012. Candidate ascertainer 1002 is to ascertain multiple assignment vectors for candidate states of the root-cause nodes of inference graph 204. State propagator 1004 is to determine probability distributions for the observation nodes of inference graph 204 for each of the multiple assignment vectors by probabilistically propagating assigned states from root-cause nodes down toward observation nodes. Score calculator 1010 is to calculate a respective score for each respective assignment vector based on respective ones of the probability distributions and responsive to observed values of the observation nodes (e.g., from observation evidence 808).

Candidate selector 1006 is to select a determinable number of candidates from the multiple assignment vectors for the candidate states so as to localize faults and to produce a list of candidates using the calculated scores. The assignment vectors and the list of candidates may be ordered based on the calculated scores. The determinable number may be preset or may be selectable by the user. Candidate ascertainer 1002 may further ascertain the multiple assignment vectors for the candidate states by setting a number of simultaneously faulty root-cause nodes of inference graph 204 to a predetermined maximum number.

In an example implementation, candidate selector 1006 is to accumulate repeated selections of a particular assignment vector for particular candidate states that corresponds to at least one particular user-perceptible network problem and is to report the particular assignment vector as a recurring source of the at least one particular user-perceptible network problem as a recurring source report 1014. Additionally, inference engine 202 is to report on impacts of the at least one particular user-perceptible network problem corresponding to the particular assignment vector by reporting in an impacts report 1014 a set of impacts that may include: a number of effected users, an average duration, and/or a frequency of occurrence of the at least one particular user-perceptible network problem.

In another example implementation, state propagator 1004 is further to propagate probabilistic states for noisy-max meta-nodes in linear time for a given number of parents using one or more approximation techniques that involve: (i) computing a probability that a child is up based on a property that a child is up when it does not depend on any parents that are not up or (ii) computing a probability that a child is down based on a property that a child is down unless each of its parents are not down or the child does not depend on them when they are down. For instance, state propagator 1004 may accelerate the child state computations for noisy-max meta-nodes by implementing any of the three equations provided herein above.

In yet another example implementation, an inference graph pre-processor 1008 is to pre-compute the probability distributions for the observation nodes of inference graph 204 given that each of the root-cause nodes corresponds to an up state. Thus, state propagator 1004 can determine the probability distributions for the observation nodes of inference graph 204 for each of the multiple assignment vectors by re-computing probability distributions for those observation nodes having a state change to at least one ancestral node and by maintaining the pre-computed probability distributions for those observation nodes that do not have a state change to an ancestral node.

In an example embodiment, significance tester 1012 is to filter out assignment vectors that might be returned by score calculator 1010 with relatively high scores but are still not likely to indicate significant user-perceptible network problems. An example implementation is based on a statistical technique that is responsive (i) to particular scores for particular assignment vectors for particular candidate states and (ii) to baseline scores for a baseline assignment vector for candidate states in which each of the root-cause nodes is given to correspond to an up state. Significance tester 1012 calculates the particular scores and the baseline scores over time using different sets of observation evidence. An example significance test implementation is described further herein below with particular reference to FIG. 13.

Figure 11:
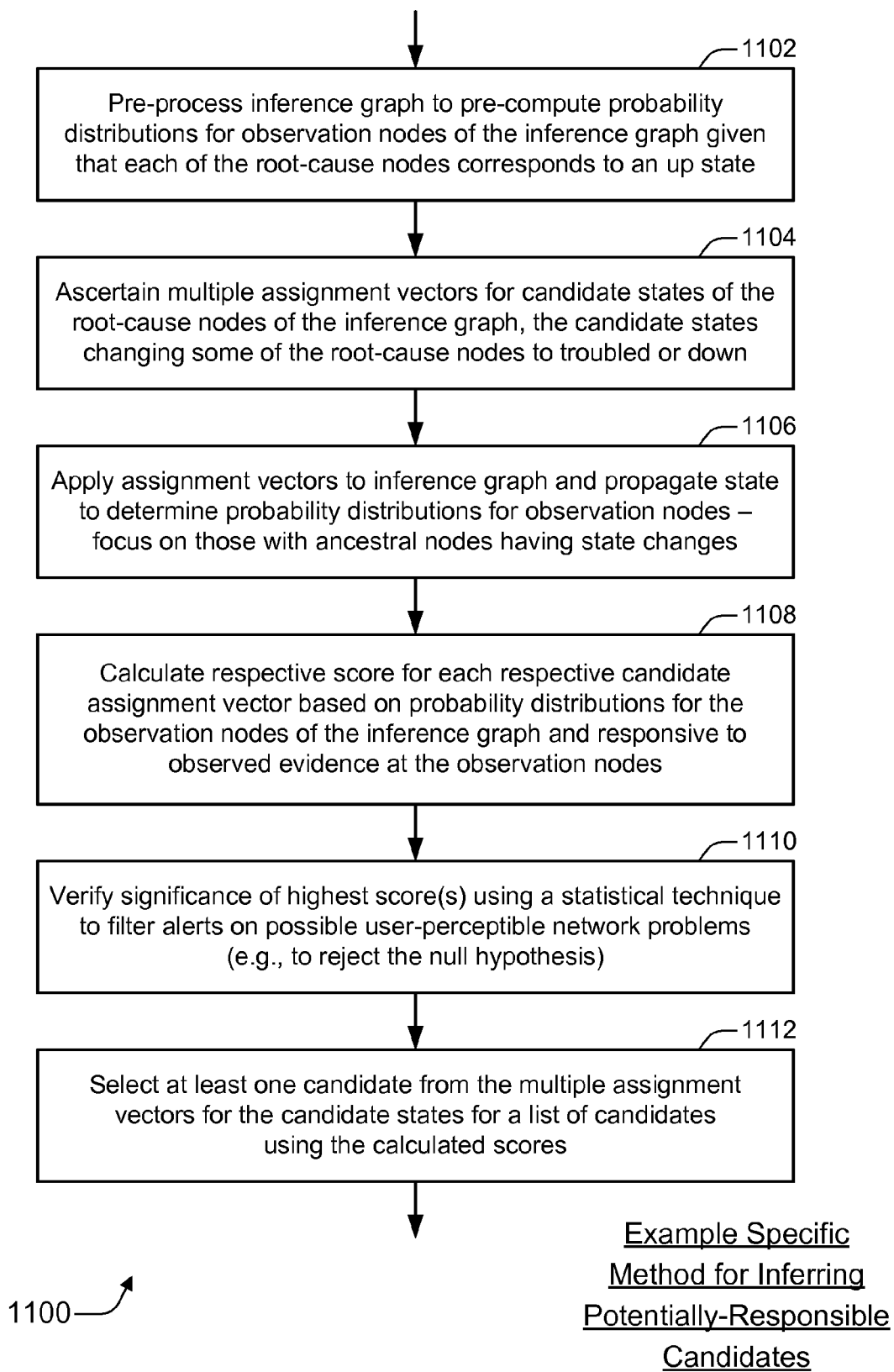
FIG. 11 is a flow diagram that illustrates another example of a general method for inferring potentially-responsible candidates.

FIG. 11 is a flow diagram 1100 that illustrates another example of a general method for inferring potentially-responsible candidates. Flow diagram 1100 includes six blocks 1102-1112. Implementations of flow diagram 1100 may be realized, for example, as processor-executable instructions and/or as at least one inference engine 202 (of FIGS. 2, 8, and 10). More detailed example embodiments for implementing portions of flow diagram 1100 are described below with reference to FIGS. 12 and 13.

In an example embodiment, at block 1102, an inference graph is pre-processed to pre-compute probability distributions for observation nodes of the inference graph given that each of the root-cause nodes corresponds to an up state. At block 1104, multiple assignment vectors are ascertained for candidate states of the root-cause nodes of the inference graph, with the candidate states assigning some of the root-cause nodes to be troubled or down.

At block 1106, assignment vectors are applied to the inference graph and the states are propagated to determine the probability distributions for the observation nodes. When the inference graph is pre-processed given that each of the root-cause nodes corresponds to an up state, the state propagation can focus on those observation nodes that have ancestral nodes with state changes (to a down or troubled state) after the assignment vector is applied.

At block 1108, a respective score is calculated for each respective candidate assignment vector based on the probability distributions determined for the observation nodes of the inference graph and responsive to the observed evidence at the observation nodes. For example, each respective score for each respective assignment vector may be calculated by assigning a relatively higher node score at each observation node having an observed value that statistically matches the corresponding probability distribution and assigning a relatively lower node score at each observation node having an observed value that fails to statistically match the corresponding probability distribution.

At block 1110, the significance of the highest score(s) may be verified using a statistical technique to filter alerts on possible user-perceptible network problems. For instance, the significance of the highest score(s) may be verified using a statistical technique to filter alerts on possible user-perceptible network problems based on a distribution that is responsive (i) to particular scores for particular assignment vectors for particular candidate states and (ii) to baseline scores for a baseline assignment vector for candidate states in which each of the root-cause nodes is given to correspond to an up state. When performed, these action(s) for significance verification can help to reject the null hypothesis. An example approach for such significance verification is described further herein below with particular reference to FIG. 13.

At block 1112, at least one candidate from the multiple assignment vectors for the candidate states are selected for a list of candidates using the calculated scores. For example, a determinable number of top candidate(s) may be selected. Furthermore, the multiple assignment vectors for the candidate states may be ranked into an ordered list. When this ordering is performed, it may be based on a confidence value derived from the calculated scores. By way of example, blocks 1102, 1104, 1106, 1108, 1110, and 1112 may be performed by the following respective components: inference graph pre-processor 1008, candidate ascertainer 1002, state propagator 1004, score calculator 1010, significance tester 1012, and candidate selector 1006.

Figure 12:
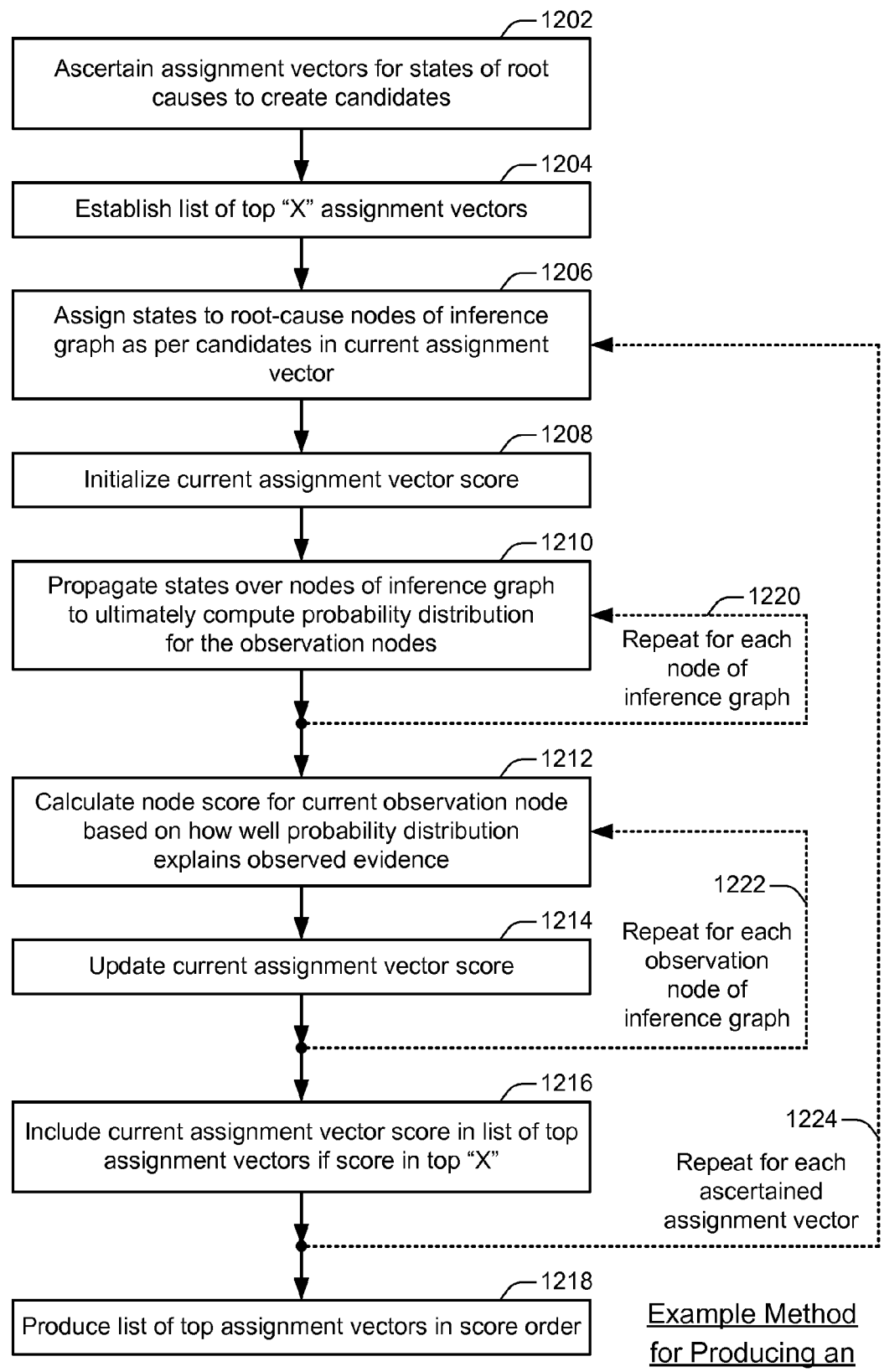
FIG. 12 is a flow diagram that illustrates an example method for producing an ordered list of candidates.

3.2: Example Specific Approaches to Inferring Potentially-Responsible Candidates FIG. 12 is a flow diagram 1200 that illustrates an example method for producing an ordered list of candidates. Flow diagram 1200 includes nine blocks 1202-1218 and three loops 1220-1224. Implementations of flow diagram 1200 may be realized, for example, as processor-executable instructions and/or as at least one inference engine 202 (of FIGS. 2, 8, and 10). The example method is also provided in pseudo-code form herein below.

In an example embodiment, an inference graph and observation evidence from the observation nodes are input to an inference engine. An integer "X" is also input to indicate a number of desired candidates in the output list of potentially-responsible candidates, with the determinable number "X" being a positive integer of one or greater. At block 1202, assignment vectors for states of root causes are ascertained to create candidates. At block 1204, an empty list of top "X" assignment vectors is established.

At block 1206, states are assigned to root-cause nodes of the inference graph as per the candidates in a current assignment vector of the ascertained assignment vectors. At block 1208, a current assignment vector score is initialized (e.g., to zero, one, etc. depending on scoring function).

At block 1210, the probabilistic states are propagated over the nodes of the inference graph to ultimately compute a probability distribution for the observation nodes. At loop 1220, the state propagation of block 1210 is repeated for each node of the inference graph.

At block 1212, a node score for a current observation node is calculated based on how well the computed probability distribution for the current observation node explains the corresponding observed evidence. At block 1214, the current assignment vector score is updated based on the node score for the current observation node. At loop 1222, the current node score calculation and the updating of the current assignment vector score of blocks 1212 and 1214 are repeated for each observation node of the inference graph.

At block 1216, the current assignment vector score is included in the list of the top assignment vectors if the current score is in the top "X" assignment vector scores. At loop 1224, the actions of blocks 1206-1216 and the repetitions of loops 1220 and 1222 are repeated for each ascertained assignment vector to analyze the overall inference graph given a set of observation evidence. At block 1218, the list of the top "X" assignment vectors is produced, and the list of assignment vectors may be in score order.

The pseudo-code below provides an example for an inference engine to produce an ordered list of candidates. In this example Algorithm 1, the score for an assignment vector is the product of the scores for individual observation nodes.

---

Algorithm 1 Ferret{Observations O, Inference Graph G, Int X}

Candidates ← (up|trouble|down) assignments to root
   causes with atmost k abnormal at any time
List$_X$ ← { }   ▷ List of top X Assignment-Vectors
for R$_a$ ∈ Candidates do  ▷ For each Assignment-Vector
  Assign States to all Root-Causes in G as per R$_a$.
  Score(R$_a$) ← 1   ▷ Initialize Score
  for Node n ∈ G do  ▷ Pre-order traversal of G
    Compute P(n) given P(parents of n)  ▷ Propagate
  end for
  for Node n ∈ G$_O$ do  ▷ Scoring Observation Nodes
    s ← P( Evidence at n | prob. density of n) ▷ How
      well does R$_a$ explain observation at n?
    Score(R$_a$) ← Score(R$_a$) * s   ▷ Total Score
  end for
  Include R$_a$ in List$_X$ if Score(R$_a$) is in top X assignment
    vectors
end for
return List$_X$

---

Figure 13:
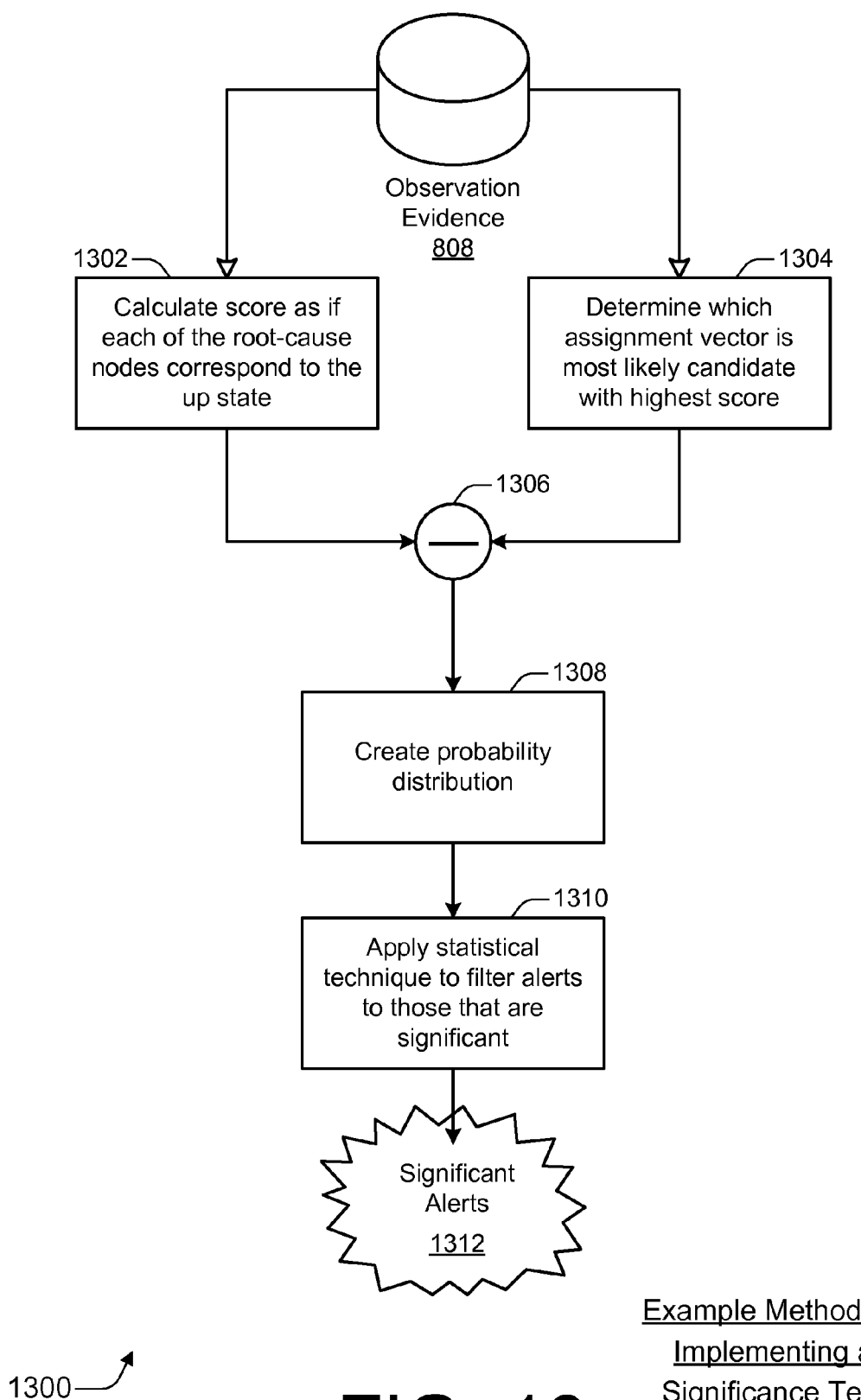
FIG. 13 is a flow diagram that illustrates an example method for implementing a significance test.

FIG. 13 is a flow diagram 1300 that illustrates an example method for implementing a significance test. Flow diagram 1300 includes four blocks 1302, 1304, 1308, and 1310 and a difference unit 1306. Implementations of flow diagram 1300 may be realized, for example, as processor-executable instructions and/or as a significance tester 1012 of an inference engine 202 (of FIGS. 2, 8, and 10).

When an inference engine produces a ranked list of assignment vectors that are potentionally responsible for a set of observations, it may employ a statistical test to determine if the prediction is sufficiently meaningful to merit attention. Generally, baseline scores for baseline assignment vectors for candidate states in which each of the root-cause nodes are given to correspond to an up state are calculated. A probability distribution is then created responsive to the differences between the baseline scores and multiple instances of candidate scores using different sets of observation evidence garnered during operation of the inference engine over time. A statistical technique is then applied to filter alerts to those that are significant given the probability distribution and based on at least one predefined criterion.

More specifically, for each set of observations, the inference engine computes a baseline score representing that the observations would arise even if all root causes were up—this is the score of the null hypothesis. Over time, the inference engine accumulates a distribution of the value (Score(best prediction)—Score(null hypothesis)). Any current predictive score better than the null hypothesis by greater than a predefined criterion may be reported as a significant alert. By way of example, the predefined criterion may be one standard deviation above the median of the distribution.

In an example embodiment, observation evidence 808 is provided to both of blocks 1302 and 1304. At block 1302, a baseline score is calculated as if each of the root-cause nodes is given to correspond to an up state in the context of the currently-observed evidence. At block 1304, the inference engine determines which assignment vector is the most likely candidate (e.g., the one with the highest score) to be responsible for the currently-observed evidence.

The differences between the baseline score and the most-likely candidate assignment vector given current observation evidence 808 are calculated at difference unit 1306 over time. The resulting difference values are used at block 1308 to create a probability distribution that may be used in the significance test. At block 1310, a statistical technique is applied to filter alerts to those that are significant. For example, a current score may be considered significant if it is some number of standard deviation(s) away from the mean of the probability distribution. Any significant alerts 1312 are then output.

Example Device Implementations for Inferring Potentially-Responsible Candidates FIG. 14 is a block diagram 1400 of an example device 1402 that may be used to implement embodiments for inferring potentially-responsible candidates. As illustrated, two devices 1402(1) and 1402(d) are capable of engaging in communications via network(s) 100, with "d" representing some integer. Although two devices 1402 are specifically shown, one or more than two devices 1402 may be employed, depending on implementation. Network(s) 100 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth.

Generally, a device 1402 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1402 includes one or more input/output (I/O) interfaces 1404, at least one processor 1406, and one or more media 1408. Media 1408 include processor-executable instructions 1410.

In an example embodiment of device 1402, I/O interfaces 1404 may include (i) a network interface for monitoring and/or communicating across network 100, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface equipment 1412 (e.g., a keyboard, a remote, a mouse or other graphical pointing device, etc.).

Generally, processor 1406 is capable of executing, performing, and/or otherwise effectuating processor-executable instructions, such as processor-executable instructions 1410. Media 1408 is comprised of one or more processor-accessible media. In other words, media 1408 may include processor-executable instructions 1410 that are executable by processor 1406 to effectuate the performance of functions by device 1402. Processor-executable instructions may be embodied as software, firmware, hardware, fixed logic circuitry, some combination thereof, and so forth.

Thus, realizations for inferring potentially-responsible candidates may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1406 may be implemented using any applicable processing-capable technology, and one may be realized as a general purpose processor (e.g., a central processing unit (CPU), a microprocessor, a controller, etc.), a graphics processing unit (GPU), a derivative thereof, and so forth. Media 1408 may be any available media that is included as part of and/or accessible by device 1402. It includes volatile and non-volatile media, removable and non-removable media, storage and transmission media (e.g., wireless or wired communication channels), hard-coded logic media, combinations thereof, and so forth. Media 1408 is tangible media when it is embodied as a manufacture and/or as a composition of matter. For example, media 1408 may include an array of disks or flash memory for longer-term mass storage of processor-executable instructions 1410, random access memory (RAM) for shorter-term storage of instructions that are currently being executed and/or otherwise processed, link(s) on network 100 for propagating communications, and so forth.

As specifically illustrated, media 1408 comprises at least processor-executable instructions 1410. Generally, processor-executable instructions 1410, when executed by processor 1406, enable device 1402 to perform the various functions described herein. Such functions include, but are not limited to: those that are illustrated in flow diagrams 900, 1100, 1200, and 1300 (of FIGS. 9, 11, 12, and 13); those that are performed by inference engine 202 (of FIGS. 2, 8, and 10) and components 1002-1012; combinations thereof; and so forth.

The devices, acts, aspects, features, functions, procedures, modules, data structures, techniques, components, units, etc. of FIGS. 1-14 are illustrated in diagrams that are divided into multiple blocks and other elements. However, the order, interconnections, interrelationships, layout, etc. in which FIGS. 1-14 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for inferring potentially-responsible candidates.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claimed invention.

What is claimed is:

1. A system comprising:
 a processor;
 an inference graph having multiple nodes, each node being associated with two or more possible states, a current state of a node being a probability distribution over the two or more possible states, the inference graph reflecting cross-layer components of a network and including multiple root-cause nodes, each root-cause node corresponding to a hardware component or a service whose failure or degradation can cause user-perceptible network problems; and
 an inference engine executed on the processor to produce from the inference graph, a list of candidates that are potentially responsible for user-perceptible network problems.

2. The system as recited in claim 1, wherein the inference graph further includes one or more observation nodes, each observation node corresponding to at least one measureable quantity of the network.

3. The system as recited in claim 1, wherein:
the two or more possible states comprise an up state, a down state, and a troubled state;
nodes in the up state correspond to timely correct responses to service requests, nodes in the down state correspond to non responses to service requests and incorrect responses to service requests, and nodes in the troubled state correspond to untimely correct responses to service requests; and
the down state and the troubled state each represent a user-perceptible network problem.

4. The system as recited in claim 2, wherein the inference engine comprises:
a candidate ascertainer to ascertain multiple assignment vectors for candidate states of root-cause nodes of the inference graph;
a state propagator to determine probability distributions for observation nodes of the inference graph for each of the multiple assignment vectors;
a score calculator to calculate a respective score for each respective assignment vector based on respective ones of the probability distributions and responsive to observed values of the observation nodes; and
a candidate selector to select the multiple assignment vectors for the candidate states for the list of candidates using the calculated scores, the list of candidates to include a determinable number of top candidates.

5. The system as recited in claim 2, wherein the at least one measurable quantity to which each observation node corresponds is selected from a group of measurable quantities including: response time, link utilization, rate or number of events, number of errors, and machine room temperature.

6. The system as recited in claim 4, wherein the candidate selector is to accumulate repeated selections of a particular assignment vector for particular candidate states that corresponds to at least one particular user-perceptible network problem and is to report the particular assignment vector as a recurring source of the at least one particular user-perceptible network problem.

7. The system as recited in claim 6, wherein the inference engine is to report on impacts of the at least one particular user-perceptible network problem corresponding to the particular assignment vector by reporting a set of impacts that include: a number of effected users, an average duration, and a frequency of occurrence of the at least one particular user-perceptible network problem.

8. The system as recited in claim 4, wherein the state propagator is further to propagate probabilistic states for noisy-max meta-nodes of the inference graph in linear time for a given number of parents using one or more approximation techniques that involve: (i) computing a probability that a child is up based on a property that a child is up when it does not depend on any parents that are not up or (ii) computing a probability that a child is down based on a property that a child is down unless each of its parents are not down or the child does not depend on them when they are down.

9. The system as recited in claim 4, wherein the candidate ascertainer is further to ascertain the multiple assignment vectors for the candidate states by setting a number of simultaneously faulty root-cause nodes of the inference graph to a predetermined maximum number.

10. The system as recited in claim 4, wherein the inference engine further comprises:
a significance tester to filter alerts on possible user-perceptible network problems based on a statistical technique that is responsive (i) to particular scores for particular assignment vectors for particular candidate states and (ii) to baseline scores for a baseline assignment vector for candidate states in which each of the root-cause nodes are given to correspond to an up state;
wherein the significance tester calculates the particular scores and the baseline scores over time using different sets of observation evidence.

11. The system as recited in claim 4, wherein the inference engine further comprises:
an inference graph pre-processor to pre-compute the probability distributions for the observation nodes of the inference graph given that each of the root-cause nodes corresponds to an up state;
wherein the state propagator is to determine the probability distributions for the observation nodes of the inference graph for each of the multiple assignment vectors by re-computing probability distributions for those observation nodes having a state change to at least one ancestral node and by maintaining the pre-computed probability distributions for those observation nodes that do not have a state change to an ancestral node.

12. A method comprising:
monitoring a network in which a response to a service request is selected from a group of responses comprising: a non response, an incorrect response, an untimely correct response, and a timely correct response, the non-response, the incorrect response, and the untimely correct response each considered a user-perceptible network problem; and
using an inference graph to produce a list of candidates that are potentially responsible for user-perceptible network problems, the candidates comprising network components including services and network elements, the inference graph including:
root-cause nodes that correspond to hardware components or services whose failure or degradation can cause the user-perceptible network problems; and
observation nodes that represent at least accesses to the services of the network.

13. The method as recited in claim 12, wherein
each node is associated with two or more possible states and corresponds to an actual state that is a probability distribution over the two or more possible states.

14. The method as recited in claim 12, wherein using the inference graph to produce the list of candidates further comprises:
ascertaining multiple assignment vectors for candidate states of the root-cause nodes of the inference graph;
determining probability distributions for the observation nodes of the inference graph for each of the multiple assignment vectors;
calculating a respective score for each respective assignment vector based on respective ones of the probability distributions and responsive to observed values of the observation nodes; and
selecting at least one candidate from the multiple assignment vectors for the candidate states for the list of candidates using the calculated scores, the list of candidates to include a determinable number of top candidates.

15. A method comprising:
ascertaining multiple assignment vectors for candidate states of root-cause nodes of an inference graph, the inference graph reflecting cross-layer components including services and hardware components of a network, the root-cause nodes corresponding to the hardware components or the services whose failure or degradation can cause user-perceptible network problems;

determining probability distributions for observation nodes of the inference graph for each of the multiple assignment vectors, each of the observation nodes corresponding to at least one measurable quantity of the network;

calculating a respective score for each respective assignment vector based on respective ones of the probability distributions and responsive to observed values of the observation nodes; and selecting at least one candidate from the multiple assignment vectors for the candidate states for a list of candidates using the calculated scores, the list of candidates to include a determinable number of top candidates.

16. The method as recited in claim 15, further comprising:
calculating baseline scores for a baseline assignment vector for candidate states in which each of the root-cause nodes are given to correspond to an up state;

determining a particular assignment vector of the multiple assignment vectors for particular candidate states that has a particular score indicating that the particular assignment vector is likely to represent a user-perceptible network problem;

creating a probability distribution responsive to differences between the baseline scores and multiple instances of the particular score over time using different sets of observation evidence; and applying a statistical technique to filter alerts to those that are significant given the probability distribution and based on at least one predefined criterion.

17. The method as recited in claim 15, wherein the act of calculating comprises:
calculating each respective score for each respective assignment vector by assigning a relatively higher score at each observation node having an observed value that statistically matches the corresponding probability distribution and assigning a relatively lower score at each observation node having an observed value that fails to statistically match the corresponding probability distribution.

18. The method as recited in claim 15, further comprising:
pre-processing the inference graph to pre-compute the probability distributions for each of the observation nodes of the inference graph given that each of the root-cause nodes corresponds to an up state;

wherein the act of determining comprises:
applying the multiple assignment vectors to the root-cause nodes of the inference graph; and propagating states to determine the probability distributions for the observation nodes by computing a probability distribution for those observation nodes with at least one ancestral node having a state change resulting from the applied assignment vector.

19. The method as recited in claim 18, wherein the act of propagating comprises:
propagating probabilistic states for noisy-max meta-nodes of the inference graph in linear time for a given number of parents using one or more approximation techniques that involve: (i) computing a probability that a child is up based on a property that a child is up when it does not depend on any parents that are not up or (ii) computing a probability that a child is down based on a property that a child is down unless each of its parents are not down or the child does not depend on them when they are down;

wherein each of the observation nodes converts the corresponding at least one measurable quantity into a probability distribution over two or more states.

20. The method as recited in claim 18, wherein the act of propagating comprises:
propagating probabilistic states for noisy-max meta-nodes of the inference graph in linear time for a given number of parents responsive to a product of respective values corresponding to each respective parent; each respective value based on up, down, and troubled probabilities of the corresponding respective parent; and propagating probabilistic states for selector meta-nodes and fail-over meta-nodes of the inference graph that correspond to load balancing infrastructure and redundancy mechanisms, respectively, of the network;

wherein meta-nodes of the inference graph are to model dependencies between the observation nodes and the root-cause nodes.

* * * * *

UNITED STATES PATENT AND TRADEMARK OFFICE
CERTIFICATE OF CORRECTION

PATENT NO. : 8,015,139 B2
APPLICATION NO. : 12/039703
DATED : September 6, 2011
INVENTOR(S) : Paramvir Bahl et al.

It is certified that error appears in the above-identified patent and that said Letters Patent is hereby corrected as shown below:

In column 7, line 22, after "meta-node" insert -- node --.

In column 7, line 24, after "meta-node" insert -- node --.

Signed and Sealed this
Sixth Day of December, 2011

David J. Kappos
*Director of the United States Patent and Trademark Office*